United States Patent
Kim et al.

(10) Patent No.: US 10,528,174 B2
(45) Date of Patent: Jan. 7, 2020

(54) ELECTRONIC DEVICE INCLUDING A PLURALITY OF INPUT DEVICES AND CONTROL METHOD THEREOF

(71) Applicant: Samsung Electronics Co., Ltd., Gyeonggi-do (KR)

(72) Inventors: Na Young Kim, Seoul (KR); Dae Hwan Kim, Gyeonggi-do (KR); Seung Wook Nam, Gyeonggi-do (KR); Hyung Woo Shin, Seoul (KR); Hye Mi Lee, Seoul (KR); Jin Hoon Cho, Gyeonggi-do (KR); Kwang Tai Kim, Gyeonggi-do (KR); Hyung Sup Byeon, Gyeonggi-do (KR); Pil Joo Yoon, Gyeonggi-do (KR); Hae Dong Lee, Daegu (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/977,136

(22) Filed: May 11, 2018

(65) Prior Publication Data

US 2018/0329560 A1   Nov. 15, 2018

(30) Foreign Application Priority Data

May 12, 2017 (KR) .......................... 10-2017-0059528

(51) Int. Cl.
*G06F 3/041* (2006.01)
*G06F 21/32* (2013.01)
(Continued)

(52) U.S. Cl.
CPC .......... *G06F 3/0414* (2013.01); *G06F 3/0487* (2013.01); *G06F 21/32* (2013.01);
(Continued)

(58) Field of Classification Search
CPC ..... G06F 3/0414–04146; G06F 3/0487; G06F 21/32; G06F 2203/04105; G06K 9/00006
(Continued)

(56) References Cited

U.S. PATENT DOCUMENTS 7,272,247 B2  9/2007 Hamid
8,443,199 B2  5/2013 Klm et al.
(Continued)

FOREIGN PATENT DOCUMENTS

| CN | 105912163 | 8/2016 |
| EP | 2 230 623 | 9/2010 |
| EP | 3 032 385 | 6/2016 |

OTHER PUBLICATIONS

European Search Report dated Sep. 21, 2018 issued in counterpart application No. 18171818.0-1216, 10 pages.

*Primary Examiner* — Michael Pervan
(74) *Attorney, Agent, or Firm* — The Farrell Law Firm, P.C.

(57) ABSTRACT

An electronic device includes a touch screen display; a pressure sensing circuit; a fingerprint sensing circuit at least partially overlapped with the pressure sensing circuit; a wireless communication circuit; at least one processor; and a memory electrically connected with the processor, wherein the memory stores instructions that, when executed, cause the processor to detect a touch input through the touch screen display and a pressure input through the pressure sensing circuit, in a first state of the electronic device, in which the finger print sensing circuit is deactivated; activate the fingerprint sensing circuit in response to the touch input or the pressure input; detect a fingerprint of a finger of a user by using the fingerprint sensing circuit while detecting pressure of the finger of the user to the first plate; and induce (Continued)

the electronic device to become in a second state or third state based at least partially on the detected pressure.

19 Claims, 30 Drawing Sheets

(51) Int. Cl.
*G06K 9/00* (2006.01)
*G06F 3/0487* (2013.01)
*G06F 21/62* (2013.01)

(52) U.S. Cl.
CPC ..... *G06F 21/6218* (2013.01); *G06K 9/00006* (2013.01); *G06F 2203/04105* (2013.01); *G06F 2221/2113* (2013.01)

(58) Field of Classification Search
USPC ............... 178/18.01–19.07; 345/173–178
See application file for complete search history.

(56) References Cited

U.S. PATENT DOCUMENTS

| | | |
|---|---|---|
| 9,547,789 B2 | 1/2017 | Park et al. |
| 2003/0068072 A1 | 4/2003 | Hamid |
| 2010/0240415 A1 | 9/2010 | Kim et al. |
| 2016/0171281 A1 | 6/2016 | Park et al. |
| 2016/0259412 A1 | 9/2016 | Flint et al. |
| 2017/0293387 A1 | 10/2017 | Zhang |
| 2017/0316250 A1* | 11/2017 | Roh ................. G06K 9/00087 |
| 2017/0351850 A1* | 12/2017 | Jin ..................... G06F 3/0414 |
| 2017/0372122 A1* | 12/2017 | Shim ................ G06F 3/0414 |
| 2018/0039332 A1* | 2/2018 | Liang ............... G06F 3/0414 |
| 2018/0210600 A1* | 7/2018 | Lee ................... G06K 9/00013 |

\* cited by examiner

ELECTRONIC DEVICE INCLUDING A PLURALITY OF INPUT DEVICES AND CONTROL METHOD THEREOF

CROSS-REFERENCE TO RELATED APPLICATION(S)

This application is based on and claims priority under 35 U.S.C. § 119 to Korean Patent Application Serial No. 10-2017-0059528, which was filed on May 12, 2017, in the Korean Intellectual Property Office, the entire disclosure of which is incorporated herein by reference.

BACKGROUND

1. Field

The present disclosure relates, generally, to an electronic device, and more particularly, to an electronic device including a plurality of input devices configured to sense pressure for fingerprint authentication.

2. Description of Related Art

Electronic devices, such as a tablet, personal computer (PC), smartphone, etc. can be equipped with or support various functions.

The electronic device may use various input units that include one or more pressure sensors.

The electronic device may provide a plurality of interfaces to distinguish between the various input units, which may be provided at different positions on the electronic device. The user, however, may find it somewhat confusing trying to differentiate between the various inputs.

The above information is presented as background information only to assist with an understanding of the present disclosure. No determination has been made, and no assertion is made, as to whether any of the above might be applicable as prior art with regard to the present disclosure.

SUMMARY

The disclosure has been made to address at least the disadvantages described above and to provide at least the advantages described below. Accordingly, an aspect of the disclosure provides an electronic device and a control method thereof, capable of performing user authentication based on pressure.

In accordance with an aspect of the disclosure, there is provided an electronic device. The electronic device includes a housing, a touch screen display positioned inside the housing, a pressure sensing circuit configured to detect pressure applied to the touch screen display by external force, a fingerprint sensing circuit at least partially overlapped with the pressure sensing circuit, a wireless communication circuit, a memory, and a processor electrically connected with the display, the pressure sensing circuit, the fingerprint sensing circuit, the memory, and the communication circuit and configured to detect a touch input through the touch screen display and a pressure input through the pressure sensing circuit, in a first state of the electronic device, in which the fingerprint sensing circuit is deactivated, activate the fingerprint sensing circuit in response to one of the touch input and the pressure input, detect a fingerprint of a finger of a user using the fingerprint sensing circuit while detecting pressure of the finger of the user to the touch screen display, and change the electronic device from the first state to a second state or third state based on the detected pressure.

In accordance with an aspect of the disclosure, there is provided method of an electronic device. The method includes detecting at least one of a touch input and a pressure input in a first state of the electronic device, detecting pressure of a finger of a user and a fingerprint of the finger in response to at least one of the touch input and the pressure input, and changing a state of the electronic device from the first state to one of a second state and a third state based on the detected pressure.

BRIEF DESCRIPTION OF THE DRAWINGS

The above and other aspects, features and advantages of certain embodiments of the disclosure will be more apparent from the following detailed description taken in conjunction with the accompanying drawings, in which:

FIGS. 13D and 13E are diagrams of a piezoelectric pressure sensor, according to an embodiment; and.

In the following description made with respect to the accompanying drawings, similar elements will be assigned with similar reference numerals.

DETAILED DESCRIPTION

Figure 1:
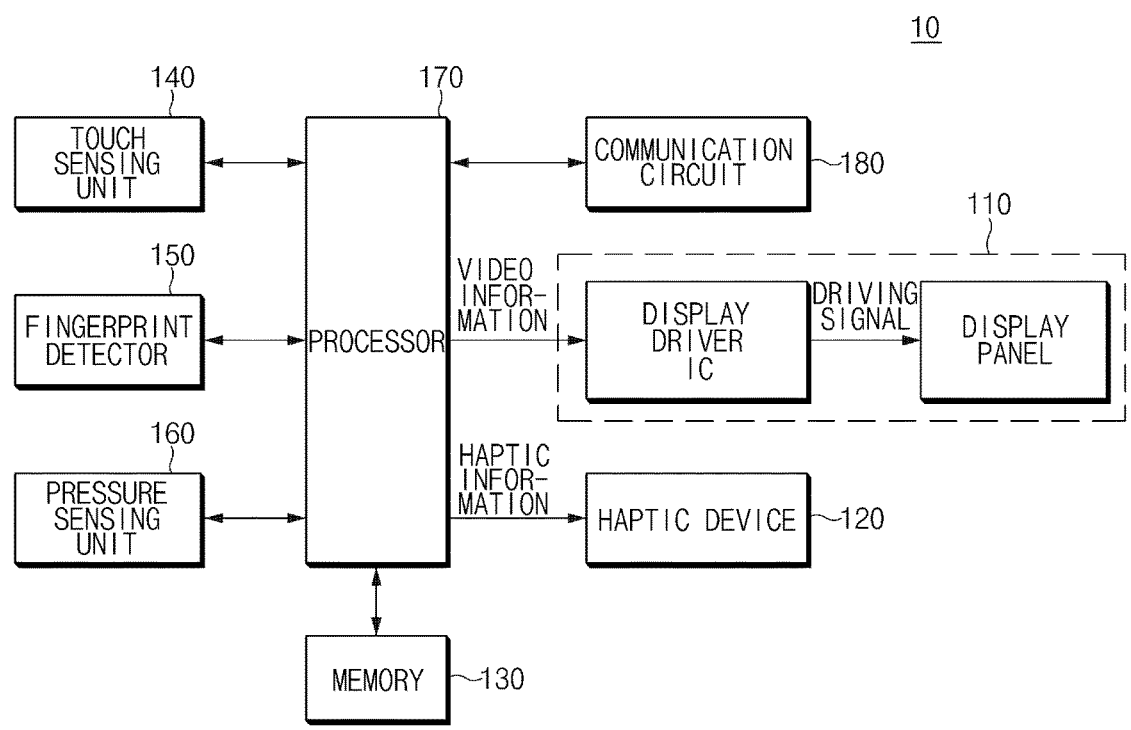
FIG. 1 is a diagram of an electronic device, according to an embodiment.

Embodiments of the disclosure will be described herein below with reference to the accompanying drawings. However, the embodiments of the disclosure are not limited to the specific embodiments and should be construed as including all modifications, changes, equivalent devices and methods, and/or alternative embodiments of the present disclosure. In the description of the drawings, similar reference numerals are used for similar elements.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may use corresponding components regardless of importance or an order and are used to distinguish a component from another without limiting the components. These terms may be used for the purpose of distinguishing one element from another element. For example, a first user device and a second user device may indicate different user devices regardless of the order or importance. For example, a first element may be referred to as a second element without departing from the scope the disclosure, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a central processing unit (CPU) or an application processor (AP)) capable of performing a corresponding operation by executing one or more software programs stored in a memory device.

The terms used in describing the various embodiments of the disclosure are for the purpose of describing particular embodiments and are not intended to limit the disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the disclosure.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the disclosure may include at least one of an application-specific integrated circuit (ASIC) chip, a field-programmable gate array (FPGA), and a programmable-logic device for performing operations which has been known or are to be developed hereinafter.

An electronic device according to the disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

The electronic device may be a home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

The electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automatic teller machine (ATM) in banks, point of sales (POS) devices in a shop, or an Internet of things (IoT) device (e.g., a light bulb, various sensors, electric or gas meter, a sprinkler device, a fire alarm, a thermostat, a streetlamp, a toaster, a sporting goods, a hot water tank, a heater, a boiler, etc.).

The electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned various devices. The electronic device may also be a flexible device. Further, the electronic device is not limited to the aforementioned devices, and may include an electronic device according to the development of new technologies.

Hereinafter, an electronic device will be described with reference to the accompanying drawings. In the disclosure, the term "user" may indicate a person using an electronic device or a device (e.g., an artificial intelligence electronic device) using an electronic device.

FIG. 1 is a diagram of an electronic device, according to an embodiment.

Referring to FIG. 1, according to an embodiment, an electronic device 10 may include a display 110, a haptic device 120, a communication circuit 180, a memory 130, a touch sensing unit 140, a pressure sensing unit 160, a fingerprint detector 150, and a processor 170. According to various embodiments, some elements may be omitted or additional elements may be provided. In addition, according to an embodiment, some of the elements may be combined with each other so as to form one entity and the functions of the elements may be performed in the same manner as before the combination.

The display 110 may include, for example, a liquid crystal display (LCD), a light-emitting diode (LED) display, an organic LED (OLED) display, or an electronic paper display. The display 110 may display, for example, various contents (e.g., a text, an image, a video, an icon, and/or a symbol) for a user. According to an embodiment, the display 110 may display information of images having different security levels.

According to an embodiment, the haptic device 120 may provide an output of stimulating a tactile sensation (e.g., a pain sensation, a pressure sensation, a cold or warming sensation). For example, the haptic device 120 may be a vibrator which vibrates with specified strength. For another example, the haptic device 120 may be a device applying a fine current having a specified intensity to the hand of a user touching the electronic device 10. For another example, the haptic device 120 may be a heating device (e.g., a thermistor) heating at a specified temperature. In this disclosure, a vibrator will be described below as an example of the haptic device 120 for the convenience of explanation.

According to an embodiment, the communication circuit 180 may communicate with an external terminal. For example, the external terminal may include at least one of a web-server providing a web page or an offline payment terminal.

According to an embodiment, the memory 130 may include a volatile memory (e.g., a random access memory (RAM)), a non-volatile memory (e.g., a read only memory (ROM), a flash memory, or the like), or the combination thereof. For example, the memory 130 may store a command or data associated with at least another element of the electronic device 10. According to an embodiment, the memory 130 may store reference data corresponding to pressure strength used for the fingerprint authentication. The reference data may be, for example, a fingerprint image of the user or a feature value of the fingerprint image. The memory 130 may store data for verifying (e.g., determining matching) fingerprint data sensed based on the reference data. The memory 130 may store result image information or haptic information to be provided as pressure fingerprint authentication is performed.

According to an embodiment, the touch sensing unit 140 may sense the touch of the user provided to at least a partial region of the display 110. For example, the touch sensing unit 140 may sense the touch of the user to the entire region of the display 110. The touch sensing unit 140 may sense the touch of the user provided to at least a portion of a display region (e.g., an active region, an inactive region, or the like) of the display 110. For another example, the touch sensing unit 140 may sense the touch of the user to a button region, e.g., a home key region of the electronic device 10. The home key region may be a partial region (e.g., a partial region of a lower portion of the display 110) of the display 110 or may be a region (e.g., a region adjacent to the lower portion of the display 110) adjacent to the display 110. The home key region may be, for example, a region having a short-cut button for entrance into a home screen of the electronic device 10 or a region for displaying the short-cut button. According to an embodiment, the touch sensing unit 140 may sense the touch of the user, e.g., in a capacitive manner.

According to an embodiment, the touch sensing unit 140 may operate in a normal mode and/or a low power mode. In the low power mode, the touch sensing unit 140 may operate at a lower touch sensing frequency and/or a lower touch scanning period, as compared with those in the normal mode. For example, the touch sensing unit 140 may operate in the low power mode in a lock state of the electronic device 10. The power mode of the touch sensing unit 140 may be controlled by the processor 170.

According to an embodiment, the fingerprint detector 150 may detect a fingerprint in at least a partial region of the region of the display 110 and a region adjacent to the display 110. For example, the fingerprint detector 150 may be configured in a size corresponding to the home key region to detect the fingerprint in the home key region. For another example, the fingerprint detector 150 may be configured in a size corresponding to the display 110 to detect the fingerprint in the entire region of the display 110. For another example, the fingerprint detector 150 may be disposed on a rear surface of the electronic device 10.

According to an embodiment, the electronic device 10 or the fingerprint detector 150 may operate in a normal mode and or a low power mode in which the electronic device 10 operates under power lower than that in the normal mode. In the low power mode, the fingerprint detector 150 may operate at a lower fingerprint sensing frequency and/or a lower fingerprint scanning period, as compared with those in the normal mode. The mode of the fingerprint detector 150 may be controlled by the processor 170.

According to an embodiment, the pressure sensing unit 160 may detect pressure applied to at least a partial region of the region of the display 110 and the region adjacent to the display 110. For example, the pressure sensing unit 160 may sense the pressure to the entire region of the display 110. For another example, the pressure sensing unit 160 may sense the pressure to the home key region provided in the region adjacent to the display 110. For another example, the pressure sensing unit 160 may be provided to sense the pressure to a position at which the fingerprint is detected by the fingerprint detector 150.

According to an embodiment, the pressure sensing unit 160 may operate in a normal mode and/or a low-power mode. In the low power mode, the pressure sensing unit 160 may operate at a lower pressure sensing frequency and/or a lower pressure scanning period, as compared with those in the normal mode. The mode of the pressure sensing unit 160 may be controlled by the processor 170.

According to an embodiment, the pressure sensing unit 160 may be integrated with another element, that is, the touch sensing unit 140 of the electronic device 10. For example, the pressure sensing unit 160 in a capacitive type may sense touch coordinates of the user instead of the touch sensing unit 140. For another example, the pressure sensing unit 160 may be installed in a region (e.g., a home key region), in which it is difficult for the touch sensing unit 140 to sense, to sense the touch of the user. In this case, for example, the electronic device 10 may include the touch sensing unit 140 in the touch screen and may include the pressure sensing unit 160 in the home key region adjacent to the display 110. Therefore, the processor 170 may sense the touch of the user to the home key region through the pressure sensing unit 160.

The processor 170 may have, for example, at least one of a central processing unit (CPU), a graphics processing unit (GPU), a micro-processor, an application processor, an application specific integrated circuits (ASIC), or a field programmable gate array (FPGA), or may have a plurality of cores. According to an embodiment, the processor 170 may perform various data processing and arithmetic operations associated with the control and/or the communication of at least one of other elements of the electronic device 10.

According to an embodiment, the processor 170 may sense the touch of the user to the display 110 and the position (e.g., touch coordinates) of the touch through the touch sensing unit 140. The touch of the user and the position of the touch are called touch data. The processor 170 may obtain a fingerprint image corresponding to the touch position through the fingerprint detector 150 when sensing the touch of the user. The processor 170 may detect pressure data (e.g., the position of sensed pressure, a pressure strength, or the like) corresponding to the touch position through the pressure sensing unit 160 when sensing the touch of the user.

According to an embodiment, the processor 170 may determine the reference data to be used for the fingerprint authentication based on the pressure strength. For example, when the pressure strength is less than a first threshold value, the processor 170 may determine the reference data to be used for the fingerprint authentication to first reference data created in a first pressure range. When the pressure strength is greater than or equal to the first threshold value, the processor 170 may determine the reference data to be used for the fingerprint authentication to second reference data created in a second pressure range. For another example, when the pressure strength is greater than or equal to the first threshold value and less than a second threshold value, the processor 170 may determine the reference data to be used for the fingerprint authentication to second reference data created in the second pressure range. For example, when the pressure strength is greater than or equal to the second threshold value, the processor 170 may determine the reference data to be used for the fingerprint authentication to third reference data created in the third pressure range. According to an embodiment, the reference data may be created based on fingerprint data registered in multiple times in each pressure range. For example, the reference data may be a fingerprint image registered in each pressure range or a feature value of the fingerprint image. According to an embodiment, as the reference data corresponding to pressure is used for the fingerprint authentication, the accuracy of the fingerprint authentication may be increased.

According to an embodiment, when a fingerprint image corresponding to a touch position is obtained, the processor 170 may load reference data corresponding to the sensed pressure range from the memory 130. The processor 170 may compare the obtained fingerprint image with the loaded reference data and may authenticate the fingerprint as being a right fingerprint when the similarity between the obtained fingerprint image and the reference data is greater than or equal to a predefined reference value, based on the comparison result. For example, the processor 170 may determine whether the fingerprint data is matched with the reference data, based on a template matching or the feature comparison.

According to an embodiment, the processor 170 may perform an operation corresponding to at least one of the state of the electronic device 10, the touch position, or the sensed pressure range, when the fingerprint is authenticated. For example, when the fingerprint is authenticated based on the touch to the home key region in the lock state of the electronic device 10, the processor 170 may release the locking of the electronic device 10. In the fingerprint authentication, the processor 170 may not open security information when the pressure strength is less than the first threshold value and may open the security information when the pressure strength is greater than or equal to the first threshold value. For example, the processor 170 may open more information as the pressure strength increases in value. For another example, when the fingerprint is authenticated based on the touch to the notification window display region in the lock state of the electronic device 10, the processor 170 may release the locking of the electronic device 10 and may execute an application corresponding to a notification window. In this case, the processor 170 may execute an application in another mode (e.g., a log-in mode or log-off mode) based on the pressure strength. For another example, when the fingerprint authentication is performed as a touch is made to one of folder objects displayed on the display 110, the processor 170 may open or may not open a file hidden in the folder based on the pressure strength.

According to an embodiment, the lock state may be defined as a state that the use of a function of the electronic device 10 is restricted. The processor 170 may display a lock screen (e.g., a clock display or a notification window display) when a specified first manipulation (e.g., a side key manipulation) is performed, after maintaining the display 110 in an off state. The lock state may be released through the fingerprint authentication or a specified second manipulation (e.g., a dragging operation for a specified position).

According to an embodiment, the processor 170 may perform an operation corresponding to the state of the electronic device 10 and the touch position and may display, on the display 110, image information corresponding to the performed operation and the pressure range through the display 110. For example, the processor 170 may display image information having no security information when the pressure range belongs to the first pressure range. For another example, the processor 170 may display image information at least partially including the security information when the pressure range belongs to the second pressure range. The processor 170 may display, for example, image information including security information having a higher level as the pressure range includes a higher pressure value.

According to an embodiment, the processor 170 may control a position and the activation of at least one of a touch sensing region, a pressure sensing region, and a fingerprint sensing region. For example, the processor 170 may always activate the touch sensing region, the pressure sensing region, and the fingerprint detecting region corresponding to the home key region regardless of the lock state of the electronic device 10. For another example, the processor 170 may deactivate the at least one region other than the home key region in the lock state of the electronic device 10 and may activate the at least one region in a lock release state of the electronic device 10.

According to an embodiment, the processor 170 may control modes of the touch sensing unit 140, the fingerprint detector 150, and the pressure sensing unit 160. For example, in the lock state of the electronic device 10, the processor 170 may operate the touch sensing unit 140, the fingerprint detector 150, and the pressure sensing unit 160 in the low power mode. For another example, when sensing the touch of the user during the operation of the touch sensing unit 140, the fingerprint detector 150, and the pressure sensing unit 160 in the low power mode, the processor 170 may operate the touch sensing unit 140, the fingerprint detector 150, and the pressure sensing unit 160 in the normal mode.

According to an embodiment, when fingerprint authentication fails, the processor 170 may inform a user of the failure of the fingerprint authentication. For example, the processor 170 may output a vibration through the haptic device 120 when the fingerprint authentication has failed. For another example, the processor 170 may display "failure in fingerprint authentication" on the display 110 when the fingerprint authentication has failed. When the fingerprint authentication has failed, the processor 170 may not perform operations corresponding to the pressure strength, the lock state of the electronic device 10, and the touch position.

According to an embodiment, the electronic device 10 may further include an iris sensor. According to an embodiment, the processor 170 may perform iris authentication and may detect a motion of an iris through the iris sensor. The processor 170 may determine, based on the motion direction of the iris, whether to provide security information and whether to open the security information. For example, the processor 170 may open specified security information when the authenticated iris moves in a specified direction. For example, the processor 170 may open the specified security information when the iris moves the specified direction in the state that both the fingerprint and the iris authentication are successful.

The above description has been made, by way of example, with reference to FIG. 1 regarding the case of performing the fingerprint authentication when the touch of the user is sensed. However, the fingerprint authentication may not be performed depending on the configuration of the electronic device 10 or may be performed with respect to only a partial region (e.g., a home key region) of the fingerprint detector 150. For example, the fingerprint detector 150 may perform, based on the pressure strength, the fingerprint authentication with respect to only the home key region or the region that the security folder is displayed.

The procedure of registering a fingerprint by the processor 170 will be described with reference to FIGS. 2A to 2D.

Figure 2A:
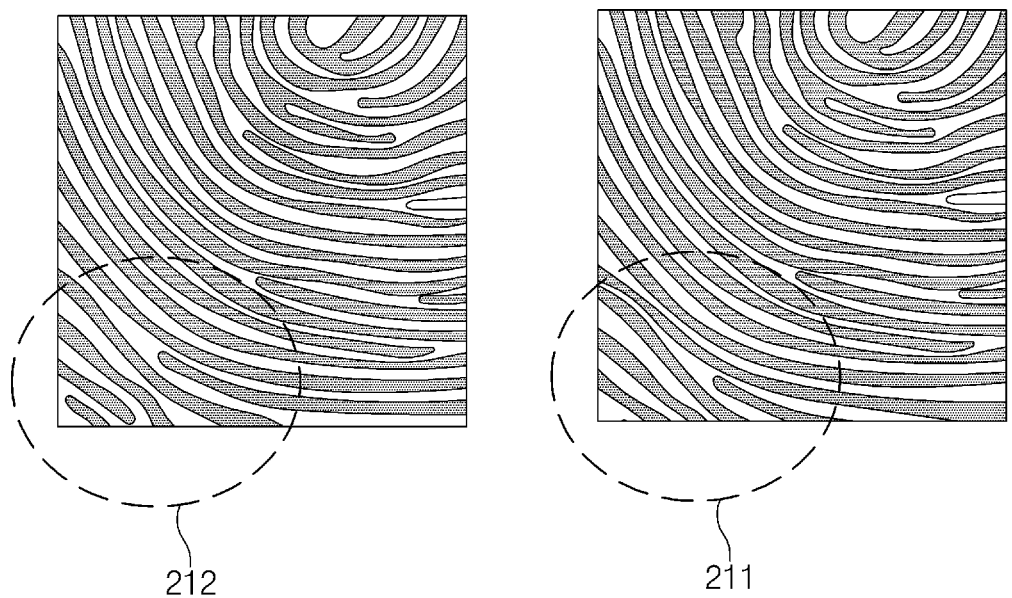
FIG. 2A is a diagram of a fingerprint based on a pressure range, according to an embodiment.

FIG. 2A is a diagram of a fingerprint based on a pressure range, according to an embodiment.

Referring to FIG. 2A, according to an embodiment, the detected fingerprint may be varied depending on the pressure strength and the pressure distribution. For example, when the pressure strength has a higher value, pressure is applied to the valley and the ridge of the detected fingerprint and thus the boundary between the valley and the ridge may be less clear as compared to the case that the pressure strength has a relatively low value. For another example, in the region having the higher pressure strength, the boundary between the ridge and the valley of the detected fingerprint may be less clear as compared to that in the region having the lower pressure strength. For another example, when the pressure distribution is not uniform, the image of the detected fingerprint may be tilted in the direction representing the higher pressure strength. In FIG. 2A, the image of the detected fingerprint may be relatively tilted in the region (region 212) having the higher pressure strength as compared to the region (region 211) having the more uniform pressure strength.

Figure 2B:
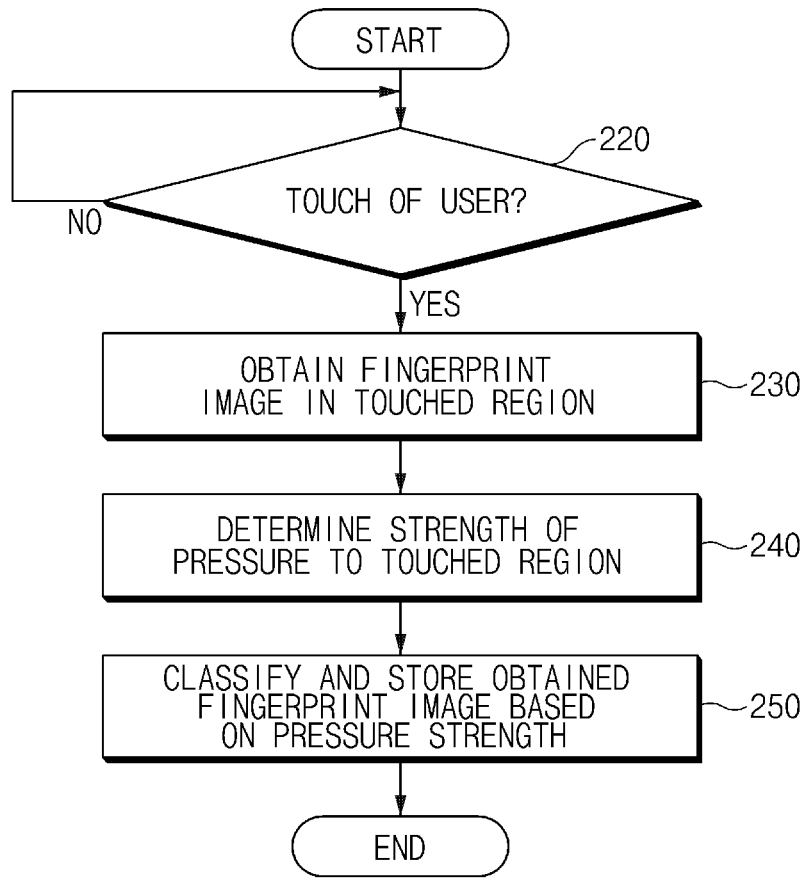
FIG. 2B is a flowchart of a method of registering a fingerprint, according to an embodiment.

FIG. 2B is a flowchart of a method of registering a fingerprint, according to an embodiment.

Referring to FIG. 2B, in step 220, the processor 170 (e.g., see processor 170 of FIG. 1) of the electronic device 10 may determine whether the touch of a user occurs for fingerprint registration. For example, when the touch of the user is sensed, the processor 170 may determine whether the position of the sensed touch of the user is present in a specified region for the fingerprint registration.

In step 230, when the touch of the user is obtained for the fingerprint registration, the processor 170 may obtain a fingerprint image of the touch region from the fingerprint detector 150.

In step 240, the processor 170 may determine the strength of pressure to the touched region through the pressure sensing unit 160 at a time point that the fingerprint image is obtained. Step 230 and step 240 may be changed in order or may be simultaneously performed.

In step 250, the processor 170 may classify the obtained fingerprint image based on the pressure strength and may store the fingerprint image in the memory 130. For example, when the pressure strength corresponding to the fingerprint image is less than the first threshold value, the processor 170 may store the obtained fingerprint image by classifying the obtained fingerprint image as being in the first pressure range. For example, the first threshold T1 may be set to the lowest pressure allowing the fingerprint detector 150 to detect a fingerprint. For example, when the pressure strength corresponding to the fingerprint image is greater than or equal to the first threshold value, the processor 170 may store the obtained fingerprint image by classifying the obtained fingerprint image as being in the second pressure range.

Figure 2C:
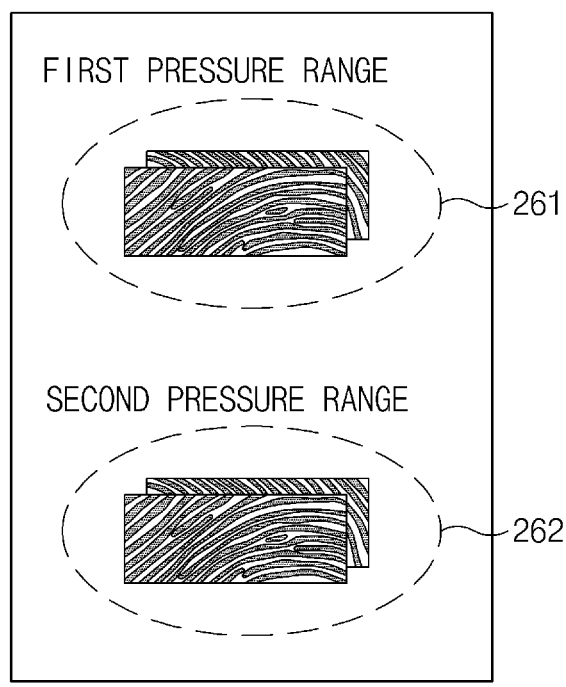
FIG. 2C is a diagram of a fingerprint image based on a pressure range, according to an embodiment.

FIG. 2C is a diagram of a fingerprint image based on a pressure range, according to an embodiment.

Referring to FIG. 2C, according to an embodiment, the processor 170 may store the obtained fingerprint image in the memory 130 by classifying the fingerprint image obtained from the fingerprint detector 150 according to the pressure ranges. For example, the processor 170 may store fingerprint images in the memory 130 by distinguishing between multiple images 261 obtained in the first pressure range and multiple images 262 obtained in the second pressure range. For another example, the processor 170 may manage an additional table (e.g., a table having storage position information) for distinguishing between the multiple images 261 obtained in the first pressure range and the multiple images 262 obtained in the second pressure range.

According to an embodiment, the multiple fingerprint images for each pressure range may be used as reference data for fingerprint authentication. For example, the processor 170 may perform the fingerprint authentication based on the comparison between one (e.g., a fingerprint image detected with respect to an intermediate pressure strength) of the fingerprint images classified according to the pressure ranges and a fingerprint image which is currently sensed. For another example, the processor 170 may extract feature values of multiple fingerprint images each pressure range, compare the extracted feature values with a feature value of the current sensed fingerprint image, and perform the fingerprint authentication based on the comparison.

Figure 2D:
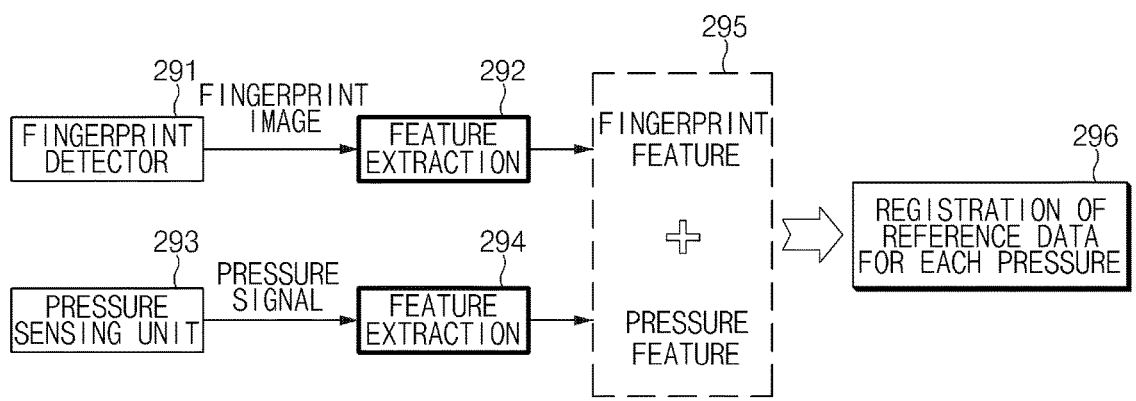
FIG. 2D is a diagram of registering reference (e.g., fingerprint) data in corresponding pressure ranges, according to an embodiment.

FIG. 2D is a diagram of registering reference (fingerprint) data in each the pressure range, according to an embodiment.

Referring to FIG. 2D, in operation 291, the fingerprint detector 150 may detect a fingerprint image corresponding to a touched position. In operation 292, the processor 170 may extract a feature value from the fingerprint image when obtaining the fingerprint image from the fingerprint detector 150. According to an embodiment, in operations 291 and 292, the processor 170 may guide fingerprint image inputs for various pressure strengths by outputting at least one of an information sound and an information image representing the pressure strength in fingerprint registration.

In operation 293, the pressure sensing unit 160 may sense a pressure strength corresponding to the fingerprint image and may output a pressure signal corresponding to the sensed pressure strength. The time points of the fingerprint detection and the pressure sensing may be synchronized with each other (e.g., the time points may be the same time points). In operation 294, when obtaining the pressure signal from the pressure sensing unit 160, the processor 170 may determine a pressure strength corresponding to the pressure signal and compare the pressure strength with at least one threshold value, thereby determining the range of the sensed pressure.

In operation 295, the processor 170 may classify the feature value ("fingerprint data") of the fingerprint image according to the pressure ranges.

In step 296, the processor 170 may register fingerprint data in each pressure range as reference data corresponding to the pressure range. The processor 170 may store the reference data corresponding to each pressure range in the memory 130 by classifying the reference data.

Figure 3A:
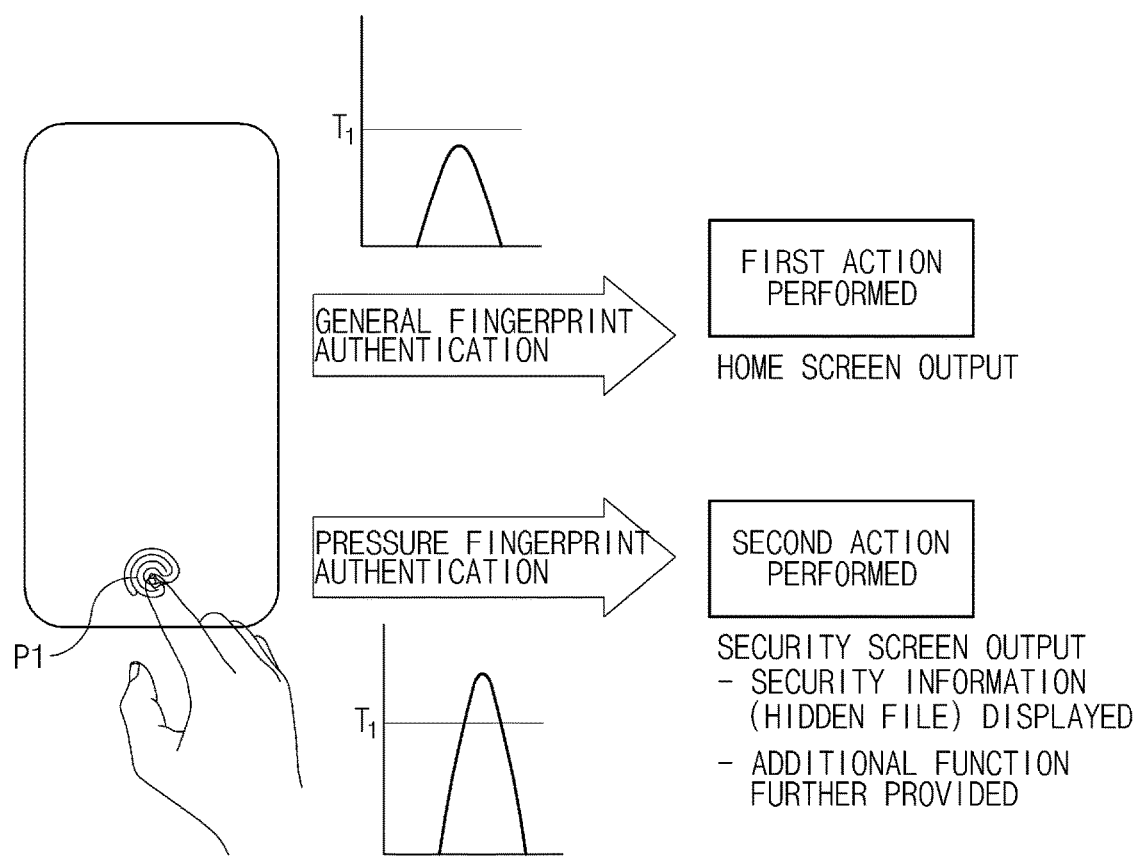
FIG. 3A is a diagram of a fingerprint authentication result screen, according to an embodiment.

FIG. 3A is a diagram of a fingerprint authentication result screen, according to an embodiment. FIG. 3A relates to an example of determining whether to open the security information based on the sensed pressure in a home key region P1.

Referring to FIG. 3A, when the touch of the user to the home key region P1 is sensed in the lock state of the electronic device 10, the processor 170 may determine a pressure strength sensed in the home key region P1. When the touch is sensed and when the at least one of the fingerprint detector 150 and the pressure sensing unit 160 is deactivated, the processor 170 may activate at least one of the fingerprint detector 150 and the pressure sensing unit 160.

According to an embodiment, the processor 170 may perform general fingerprint authentication using the sensed fingerprint image when the sensed pressure strength in the home key region P1 is less than a first threshold value T1. When the general fingerprint is authenticated, the processor 170 may perform a first operation corresponding to the general fingerprint authentication. For example, when the general fingerprint is authenticated, the processor 170 may output a home screen ("standby screen") on the display 110 corresponding to the manipulation to the home key region. The home screen may be a screen in which specified security information (e.g., hidden file) is not open.

According to an embodiment, the processor 170 may perform pressure fingerprint authentication using the sensed fingerprint image when a pressure strength sensed in the home key region P1 is greater than or equal to the first threshold value T1. When the pressure fingerprint is authenticated, the processor 170 may perform an operation corresponding to the pressure fingerprint authentication. For example, when the pressure fingerprint authentication is successful, the processor 170 may output a security screen on the display 110. The security screen may be a screen in which the specified security information (e.g., hidden file (secure folder)) is open or a specified additional function (e.g., Samsung Pay™ function) is additionally provided.

Figure 3B:
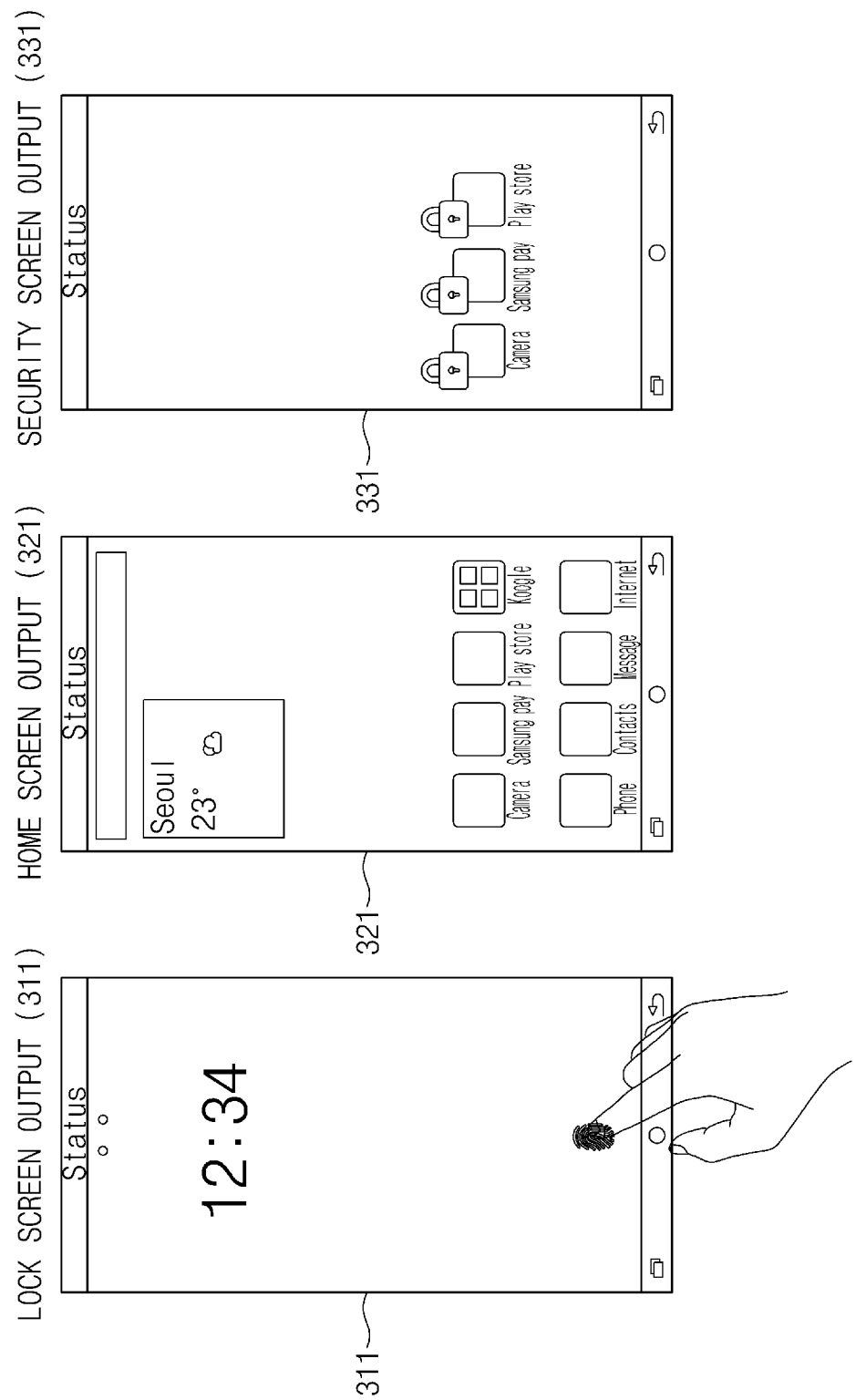
FIG. 3B is a diagram of screens provided as results of operations of FIG. 3A, according to an embodiment.

FIG. 3B is a diagram of screens provided as execution results of operations of FIG. 3A, according to an embodiment.

Referring to FIG. 3B, the processor 170 may display a lock screen 311 including time information in the lock state of the electronic device 10. For example, when the display 110 is configured to be always activated (always on display (AOD)), the processor 170 may always display the lock screen 311. For another example, when the display 110 is configured to be deactivated in the lock state, the processor 170 may display the lock screen 311 when the touch of the user is recognized.

According to an embodiment, when the lock of the electronic device 10 is released through the general fingerprint authentication, the processor 170 may provide a home screen 321. For example, the home screen 321 may be a screen displayed under a general execution environment (normal world, rich execution environment (REE)). For another example, the home screen 321 may be a main menu screen on which objects of applications executed in the electronic device 10 are gathered. The object of an application, for example, may be a menu for selecting the execution of the application or the execution of a specific function of the application. For example, the home screen 321 may include a widget.

According to an embodiment, when the lock of the electronic device 10 is released through pressure fingerprint authentication, the processor 170 may provide a security screen 331. The security screen 331 may be a screen displayed under a security execution environment (secure world, trusted execution environment (TEE)) having relatively enhanced security. For example, the security screen 331 may include an object of an application, such as a payment application, requiring the security. For another example, the security screen 331 may include security information of a secure folder or a hidden file (e.g., personal information or intrinsic information of an electronic device).

According to an embodiment, the following description will be made regarding the case that pressure values are classified into two ranges and security information is not open in the first pressure range (less than the first threshold value) and open in the second pressure range (greater than or equal to the first threshold value). However, the processor 170 may classify pressure values into three pressure ranges or more and may perform a control operation by setting open degrees of security information differently depending on the pressure ranges.

Figure 4:
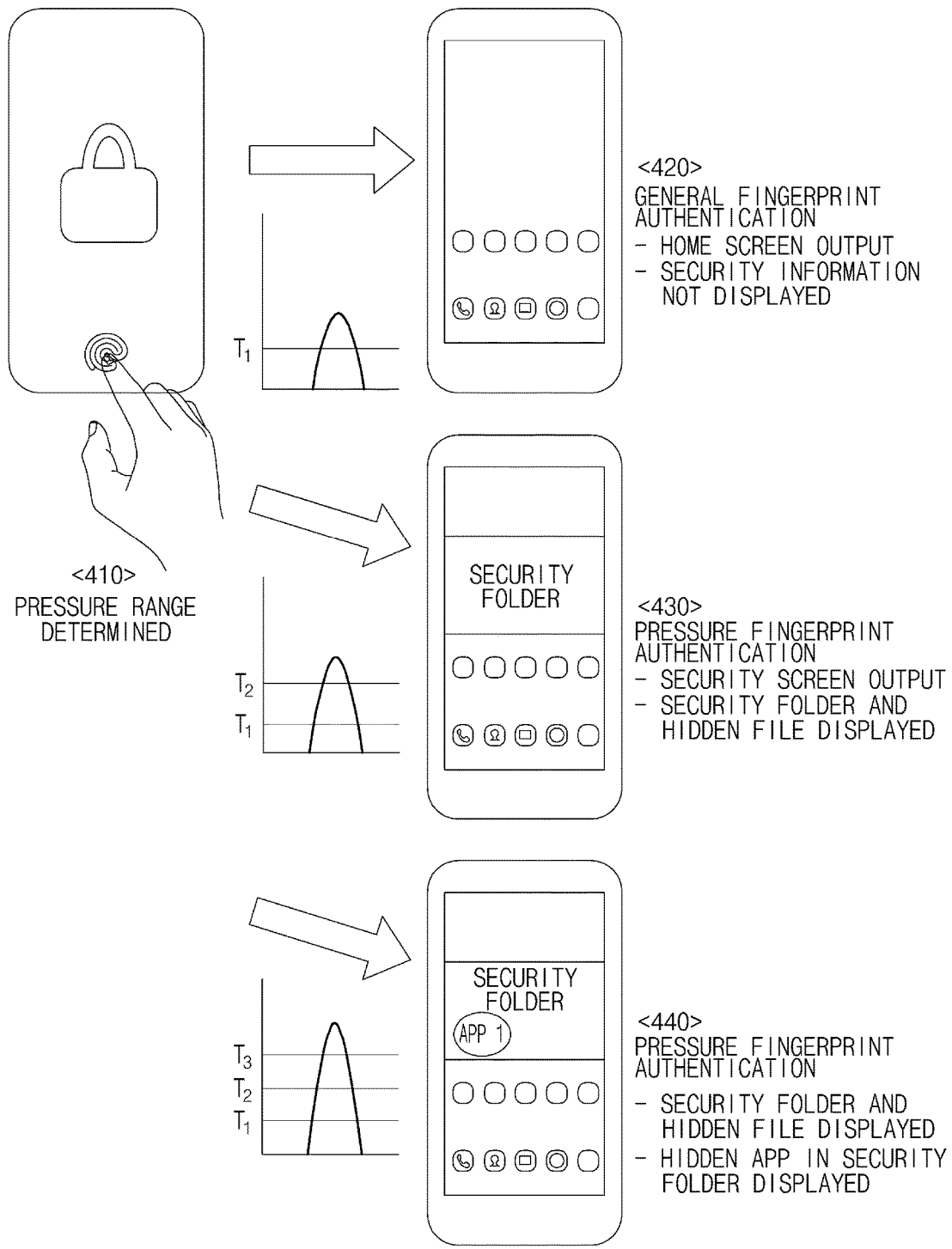
FIG. 4 is a diagram of a fingerprint authentication result screen, according to an embodiment.

FIG. 4 is a diagram of the fingerprint authentication result screen, according to an embodiment. FIG. 4 is an example wherein sensed pressure values are classified into three pressure ranges and the open degree of security information is varied depending on the pressure ranges.

According to an embodiment, when sensing the touch of the user to the home key region P1, the processor 170 may obtain a fingerprint image and may determine one of the first to third pressure ranges, to which pressure strength belongs (at 410). For example, the first pressure range is a range that the pressure strength is greater than or equal to the first threshold value and less than the second threshold value. The second pressure range is a range that the pressure strength is greater than or equal to the second threshold value and less than the third threshold value. The third pressure range is a range that the pressure strength is greater than or equal to the third threshold value. The first threshold value T1 may be the minimum pressure.

According to an embodiment, when the pressure strength belongs to the first pressure range, the processor 170 may perform the general fingerprint authentication using the obtained fingerprint image. Referring to 420, the processor 170 may display, for example, the home screen on the display 110 when the general fingerprint authentication is successful. For example, the general home screen may be a screen in which the security information (e.g., a security folder or a hidden file) is not displayed. For example, the general fingerprint authentication may be a fingerprint authentication manner of comparing the sensed fingerprint image (or fingerprint data extracted from the sensed fingerprint image) with the first reference data created in the first pressure range.

According to an embodiment, the processor 170 may perform first pressure fingerprint authentication using the obtained fingerprint image and the reference data in the second pressure range, when the pressure strength belongs to the second pressure range. Referring to 430, the processor 170 may display, for example, a first security screen on the display 110 when the pressure fingerprint authentication is successful. For example, the first security screen may be a screen in which the secure folder and the hidden file are displayed (or open). For example, the first pressure fingerprint authentication may be a fingerprint authentication manner of comparing the sensed fingerprint image (or fingerprint data extracted from the sensed fingerprint image) with the second reference data created in the second pressure range.

According to an embodiment, the processor 170 may perform second pressure fingerprint authentication using the obtained fingerprint image and the reference data in the third pressure range, when the pressure strength belongs to the third pressure range. Referring to 440, the processor 170 may display, for example, the second security screen on the display 110 when the second pressure fingerprint authentication is successful. For example, the second security screen may be a screen in which the secure folder, the hidden file, and an application hidden in the secure folder are displayed. For example, the second pressure fingerprint authentication may be fingerprint authentication determined by comparing the sensed fingerprint image (or fingerprint data extracted from the sensed fingerprint image) with the third reference data created in the third pressure range.

Figure 5A:
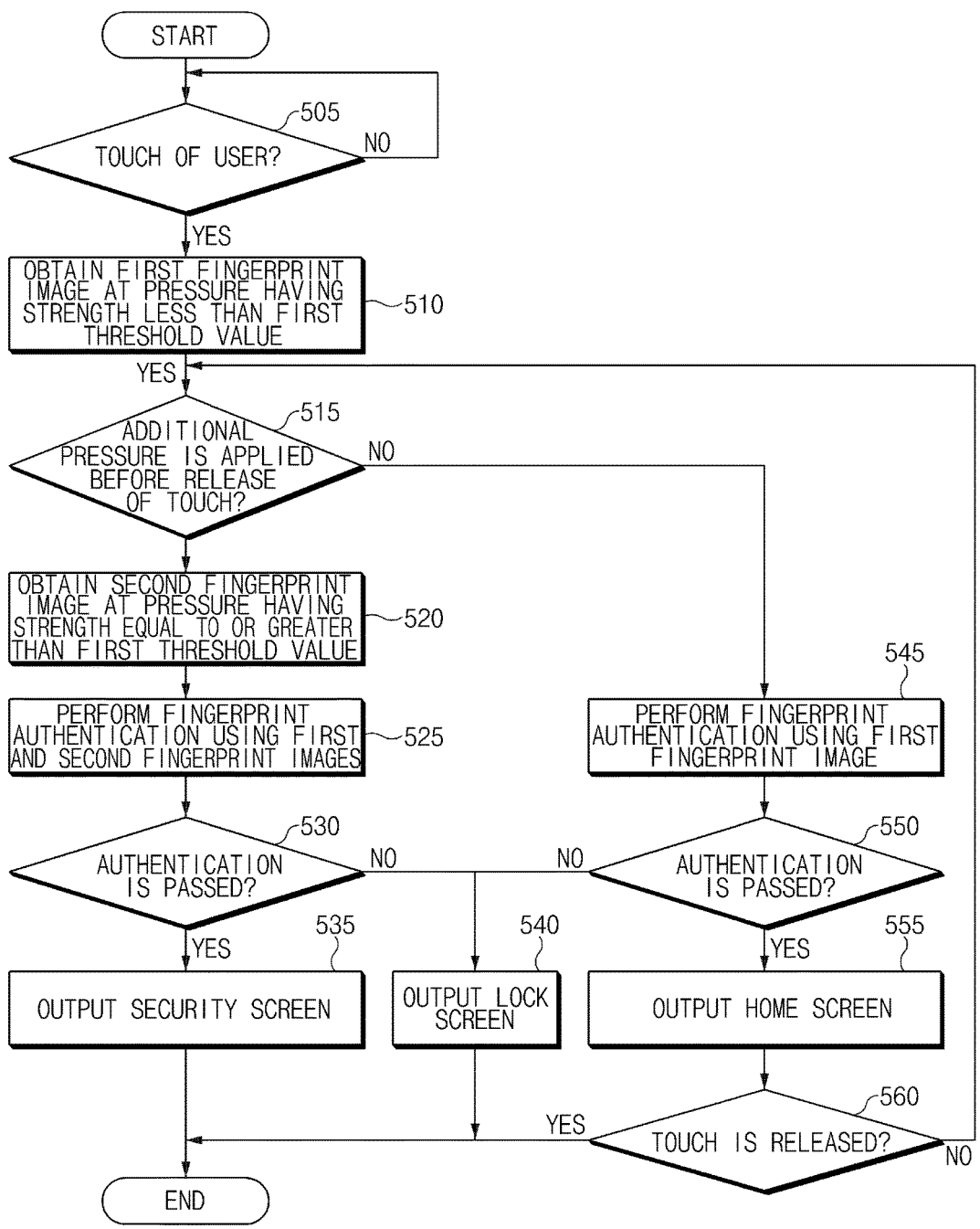
FIG. 5A is a flowchart of a method of a double fingerprint authentication process, according to an embodiment.

FIG. 5A is a flowchart of a method of a double fingerprint authentication manner, according to an embodiment. FIG. 5A relates to an example of displaying a security screen only when both fingerprint authentications including the general fingerprint authentication and the pressure fingerprint authentication are performed.

Referring to FIG. 5A, in step 505, a processor (the processor 170 of FIG. 1) may determine whether the touch of the user is made through the electronic device 10.

In step 510, when the touch of the user is sensed, the processor 170 may obtain a first fingerprint image with respect to pressure having less than the first threshold value.

In step 515, the processor 170 may determine that additional pressure is sensed without releasing the touch after the first fingerprint image is obtained. In step 515, the processor 170 may determine whether the strength of the additional pressure is greater than or equal to the first threshold value.

In step 515, the processor 170 may output a user interface (UI) image showing the strength of the pressure which is currently sensed. For example, the processor 170 may output a UI image allowing the comparison between the first threshold value and the sensed pressure strength. The UI image may be displayed around the position of the touch of the user and may have a circular shape or a polygonal shape enlarged or reduced depending on the pressure strength. The circular shape or the polygonal shape may be a shape representing a boundary line corresponding to pressure having the first threshold value.

In step 520, the processor 170 may obtain the second fingerprint image when the strength of the additional pressure is greater than or equal to the first threshold value.

In step 525, the processor 170 may perform fingerprint authentication using the first fingerprint image and fingerprint authentication using the second fingerprint image when the first and second fingerprint images are obtained. For example, the processor 170 may perform the fingerprint authentication by comparing the first fingerprint image with a reference image created at less than the first threshold value. For example, the processor 170 may perform the fingerprint authentication by comparing the second fingerprint image with a reference image created at the pressure having the first threshold value or more.

In step 530, the processor 170 may determine whether two fingerprint authentications using the first and second fingerprint images are successful.

In step 535, the processor 170 may output a security screen when both fingerprint authentications using the first and second fingerprint images are successful. For example, the security screen may be a screen including at least one piece of security information (e.g., a secure folder).

In step 540, the processor 170 may output the lock screen when at least one of two fingerprint authentications using the first and second fingerprint images have failed. In step 540, the processor 170 may output the UI image and the sound for notifying of the authentication failure when the two fingerprint authentications have failed.

In step 545, when additional pressure is not present or obtainable during specific time after the first fingerprint image is obtained or when the touch is released without applying additional pressure, the processor 170 may perform the fingerprint authentication using the first fingerprint image.

In step 550, the processor 170 may output a specified screen (e.g., a home screen) when the fingerprint authentication is successful by performing the fingerprint authentication using the first fingerprint image. The specified screen may be a screen having no security information. When the fingerprint authentication using the first fingerprint image has failed, the processor 170 may output the lock screen in step 540. When the fingerprint authentication using the first fingerprint image has failed, the processor 170 may output the UI image and the sound for notifying of the authentication failure.

In step 560, when the touch is not released after the home screen is output, the processor 170 may determine whether the additional pressure is applied. When the additional pressure is applied, the processor 170 may obtain the second fingerprint image, may perform the fingerprint authentication using the second fingerprint image, and may provide the security screen as the result of the fingerprint authentication. Conversely, the processor 170 may terminate the fingerprint authentication procedure after the security screen and the lock screen are output.

According to an embodiment, after a plurality of security authentication procedures have been performed, the security screen may be provided. Therefore, the fingerprint authentication may be performed with a higher degree of accuracy, and thus the security for the security information may be more enhanced.

Figure 5B:
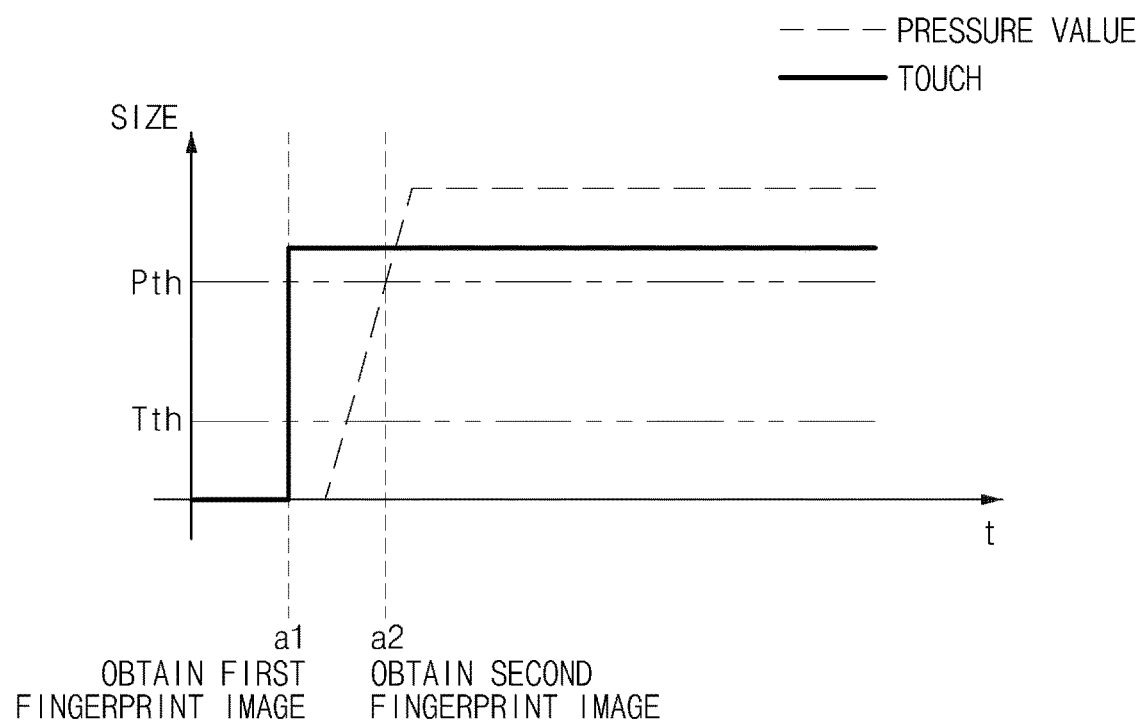
FIG. 5B is a graph of time points at which a plurality of fingerprint images are obtained, according to an embodiment.

FIG. 5B is a graph of time points at which a plurality of fingerprint images are obtained, according to an embodiment.

Referring to FIG. 5B, according to an embodiment, the processor 170 may obtain the first fingerprint image at the time point a1 at which the touch of the user having the touch threshold value $T^{th}$ or more is sensed. For example, the first fingerprint image may be obtained at the pressure having less than a specified threshold value. According to an embodiment. The processor 170 may obtain the second fingerprint image at a relevant time point a2, when the pressure having the specified pressure threshold value or more is sensed without releasing the touch of the user.

Figure 5C:
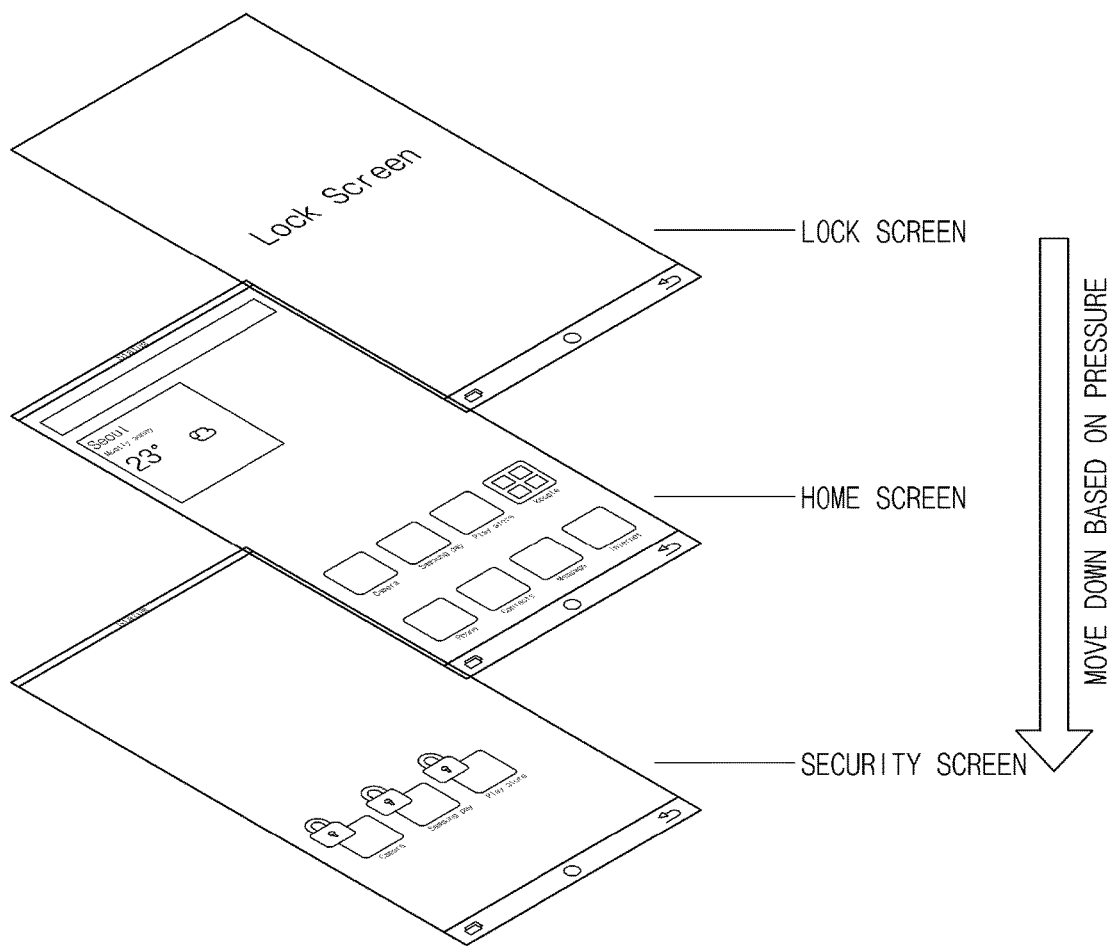
FIG. 5C is a diagram of different screens, according to an embodiment.

FIG. 5C is a diagram of provided screens, according to an embodiment.

Referring to FIG. 5C, according to an embodiment, the processor 170 may output the lock screen in the lock state of the electronic device 10. The processor 170 may provide the home screen when the general fingerprint authentication using the first fingerprint image is successful during the output of the lock screen. The processor 170 may output the security screen when the two fingerprint authentications using the first and second fingerprint images are successful.

According to an embodiment, the processor 170 may control the open degree of the security information depending on the sensed pressure. For example, the processor 170 may provide a UI for providing more security information. For another example, the processor 170 may enhance the security more by having a higher security level through multiple authentication procedures.

Figure 5D:
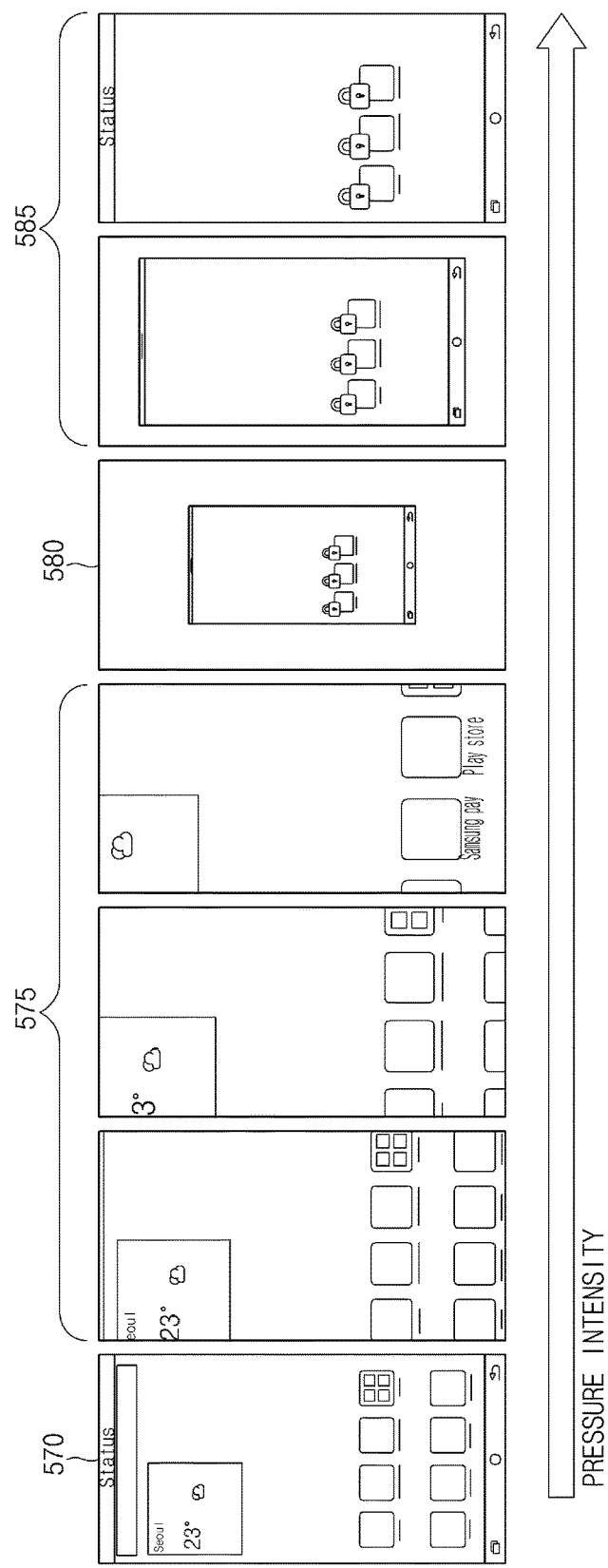
FIG. 5D is a diagram of a screen output in a fingerprint authentication procedure, according to an embodiment.

FIG. 5D is a diagram of a screen output in the fingerprint authentication procedure, according to an embodiment. FIG. 5D relates to a variation in a sensed pressure strength by enlarging screen of the display.

Referring to FIG. 5D, according to an embodiment, when the fingerprint authentication using the first fingerprint image is successful, the processor 170 may output a home screen on the display 110, as illustrated by reference numeral 570. For example, the processor 170 may display the home screen by enlarging the home screen corresponding to the variation in the pressure strength. For example, the enlarged home screen may be a shape for emphasizing a specified object. For example, the specified object may be at least one of an object representing a higher use frequency, an object specified by a provider, or an object requiring security.

According to an embodiment, the processor 170 may obtain a second fingerprint image from the fingerprint detector 150 when the sensed pressure strength is greater than or equal the first threshold value during the display of the enlarged home screen. As in illustrated by reference numeral 580, when the second image is obtained, for example, the processor 170 may perform the fingerprint authentication using the second fingerprint image and may output the security screen when the fingerprint authentication is successful.

According to an embodiment, in reference numeral 585, the processor 170 may display the security screen by enlarging the security screen corresponding to the variation in the pressure strength when the pressure strength is increased without releasing the touch even after outputting the security screen. For example, the enlarged security screen may be a shape for emphasizing a specified object.

FIG. 5D has been described, by way of example, regarding the case that the screen is changed depending on the pressure strength while the touch of the user is being maintained. The processor 170 may provide one screen for one touch of the user.

Figure 6:
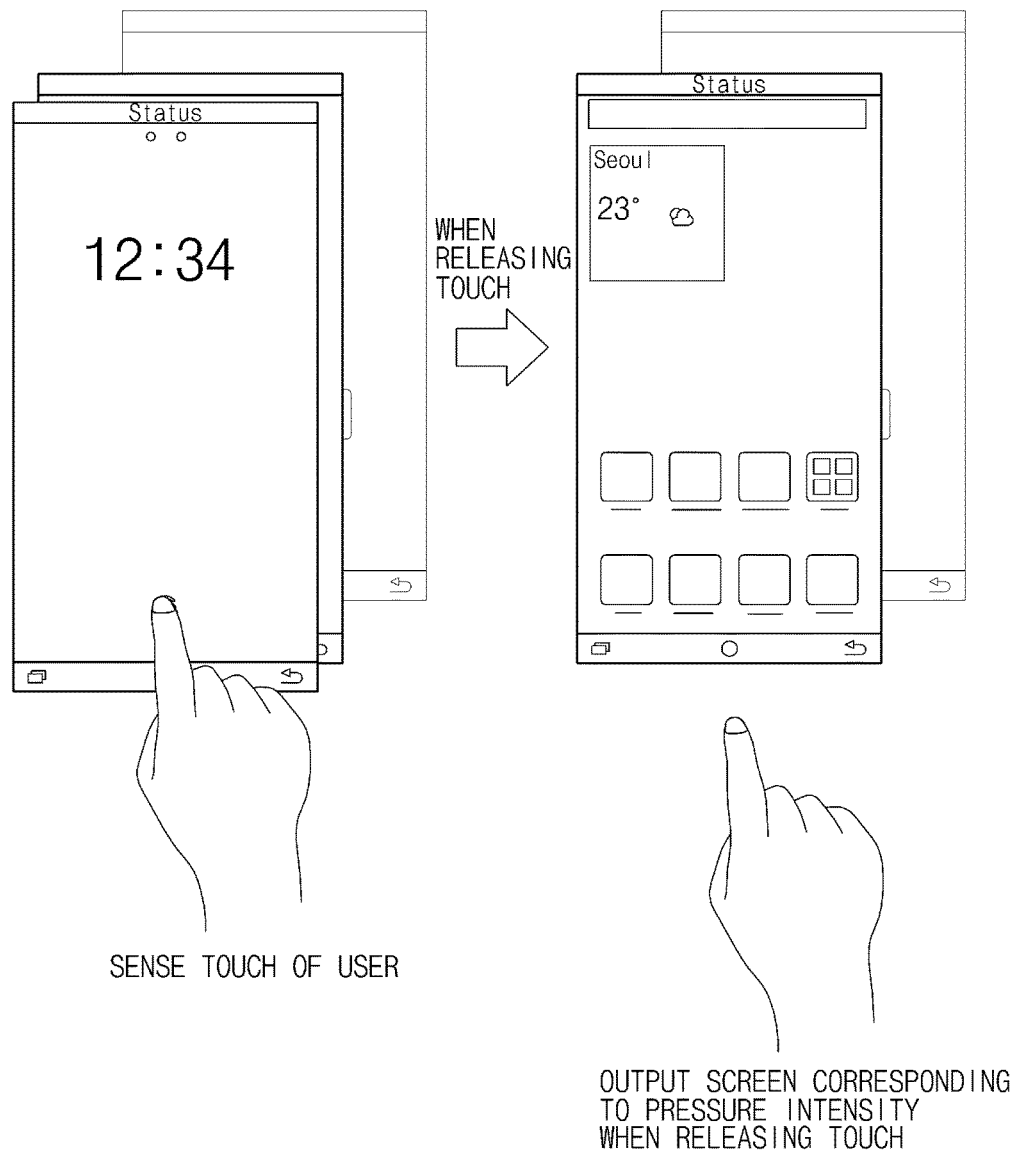
FIG. 6 is a diagram of a fingerprint authentication result screen, according to an embodiment.

FIG. 6 is a diagram of a fingerprint authentication result screen, according to an embodiment.

Referring to FIG. 6, according to an embodiment, the processor 170 may determine a change of the pressure strength while detecting the fingerprint until the touch is released after the touch of the user. For example, the processor 170 may compare the largest/greatest pressure strength (or average pressure strength) with the first threshold value. For example, when the largest pressure strength is less than the first threshold value, the processor 170 may compare the fingerprint image detected at less than the first threshold value with reference data corresponding to less than the first threshold value, and perform fingerprint authentication ("general fingerprint authentication") based on the comparison result. The processor 170 may output the home screen when the general fingerprint authentication is successful. When the largest pressure strength is greater than or equal to the first threshold value, the processor 170 may compare the fingerprint image detected at the first threshold value or more with reference data corresponding to the first threshold value or more, and perform fingerprint authentication ("pressure fingerprint authentication") based on the comparison result. The processor 170 may output the security screen when the pressure fingerprint authentication is successful.

According to an embodiment, the processor 170 may perform fingerprint authentication when the touch position of the user is changed. For example, the user may drag the lock screen in a specified direction (e.g., from left to right) to release the locking of the electronic device 10. The processor 170 may obtain the information on the pressure strength and the fingerprint image at each drag point. When the touch of the user is released, the processor 170 may perform the fingerprint authentication by using the obtained information on the pressure strength and the obtained fingerprint image. For example, when the touch of the user is released, the processor 170 may perform fingerprint authentication using the fingerprint image corresponding to the largest pressure strength sensed during dragging.

According to an embodiment, the processor 170 may output a UI image representing the pressure strength, which is sensed during the touch of the user, and the first threshold value.

According to an embodiment, the processor 170 may perform fingerprint authentication corresponding to an object displayed on the display 110.

Figure 7A:
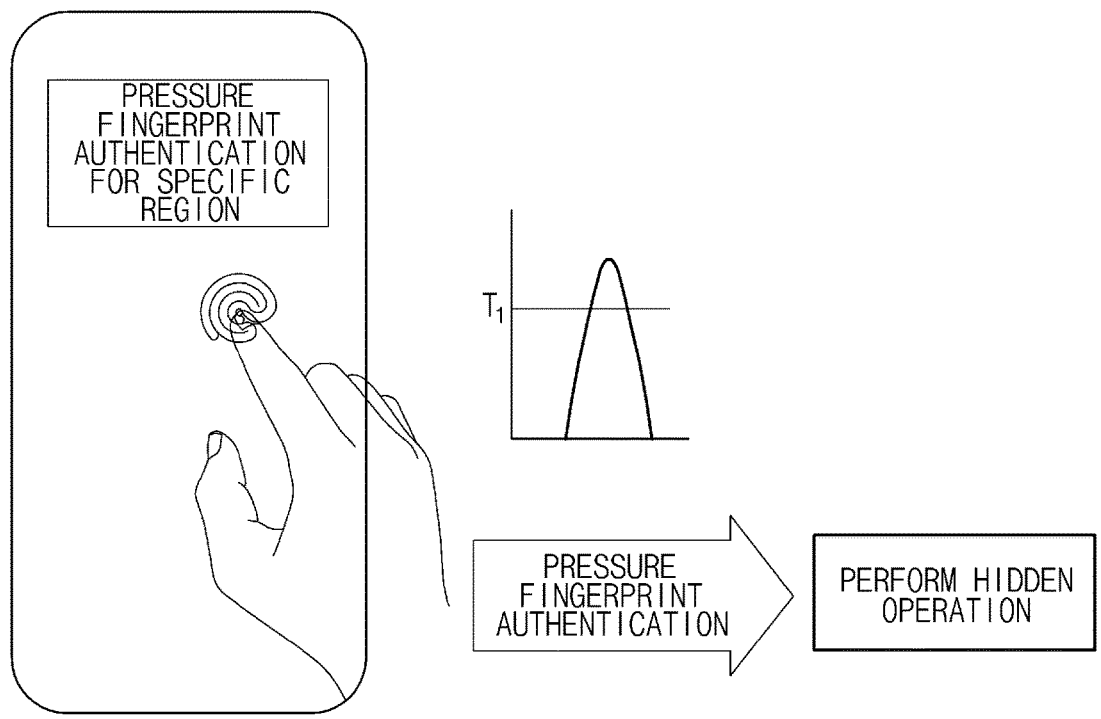
FIG. 7A is a diagram of a fingerprint authentication result screen corresponding to an object touched by a user, according to an embodiment.

FIG. 7A is a view illustrating a fingerprint authentication result screen corresponding to an object touched by a user, according to an embodiment.

As illustrated in FIG. 7A, according to an embodiment, the processor 170 may recognize that the touch position of the user, which is obtained from the touch sensing unit 140, corresponds to one of objects displayed on the display 110. When the strength of pressure sensed to the touched object is greater than or equal to the first threshold value, the processor 170 may perform the pressure fingerprint authentication using the fingerprint image detected from the touched object. When the pressure fingerprint authentication is successful, the processor 170 may perform an operation corresponding to the pressure fingerprint authentication for the touched object. When the pressure strength sensed to the touched object is less than the first threshold value, the general fingerprint authentication is performed. When the general fingerprint authentication is successful, the processor 170 may perform an operation corresponding to the general fingerprint authentication for the touched object.

According to an embodiment, when the touched object is 'photo gallery' and when the pressure fingerprint authentication is successful, the processor 170 may display images and albums hidden in the photo gallery. For another example, when the general fingerprint authentication is successful, the processor 170 may not display the images and albums hidden in the photo gallery. The hidden images and albums may be, for example, set depending on a user input. For another example, when the touched object is 'my file' and when the pressure fingerprint authentication is successful, the processor 170 may display hidden files and hidden folders. The hidden images and the hidden folders may be, for example, set depending on a user input. For another example, when the general fingerprint authentication is successful, the processor 170 may not display the hidden images and the hidden folders. For another example, the touched object may be an object of a social network services/sites (SNS)-based application. When the general fingerprint authentication is successful, the processor 170 may not display a hidden conversation of the SNS-based application. When the pressure fingerprint authentication is successful, the processor 170 may display the hidden conversation. The hidden conversation may be, for example, set depending on a user input. For another example, the touched object may be an object of a web-browser. When the general fingerprint authentication is successful, the processor 170 may execute the web-browser in a general Internet mode. When the pressure fingerprint authentication is successful, the processor 170 may execute the web-browser in a security mode. The security mode may be, for example, a mode for restricting the access to a specified web-site. For example, the security mode may be a mode for providing a web-browser having a web-site logged in. For example, the security mode may be a mode that the access to the web-site is not recorded. For another example, the touched object may be an object of contacts. When the general fingerprint authentication is successful, the processor 170 may not display hidden contacts in an address book. When the pressure fingerprint authentication is successful, the processor 170 may display the hidden contacts in the address book. The hidden contacts may be, for example, set depending on a user input.

Figure 7B:
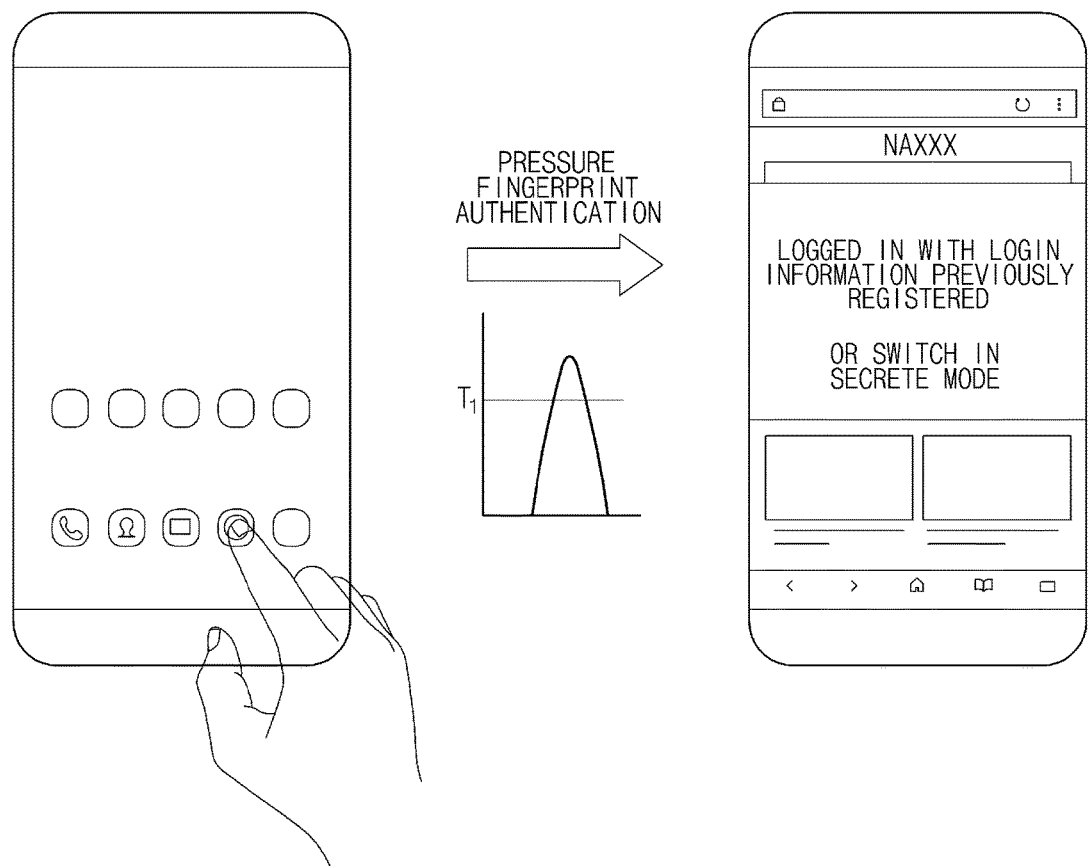
FIG. 7B is a diagram of a web-browser executed based on a pressure fingerprint authentication, according to an embodiment.

FIG. 7B is a diagram of a web-browser that is executed based on the pressure fingerprint authentication, according to an embodiment.

As illustrated in FIG. 7B, according to an embodiment, the user may touch an object corresponding to the web-browser to execute the web-browser. The processor 170 may determine that the touched object is the web-browser and may execute the touched web-browser. The processor 170 may display a specified web-page on the executed web-browser. The specified web-page may be, for example, an activated web-page or a specified web-page among web-pages registered in a bookmark.

According to an embodiment, when an automatic login function is set for the specified web-page, the processor 170 may provide the automatic login function for the web-page depending on the sensed pressure strength. For example, when the sensed pressure strength corresponding to the touched web-browser is less than the first threshold value, the processor 170 may display the activated web-page in a logoff state. For another example, when the sensed pressure strength corresponding to the touched object is greater than or equal to the first threshold value and when the pressure fingerprint authentication is successful, the processor 170 may display the specified web-page in a login state. For another example, when the sensed pressure strength corresponding to the touched object is greater than or equal to the first threshold value and when the pressure fingerprint authentication is successful, the processor 170 may display the specified web-page in another security mode (e.g., a manager mode, a security mode). For another example, when the sensed pressure strength corresponding to the touched object is greater than or equal to the first threshold value, and when the pressure fingerprint authentication is successful, the processor 170 may additionally display, on the web-browser, a bookmark that is set to be hidden.

Figure 7C:
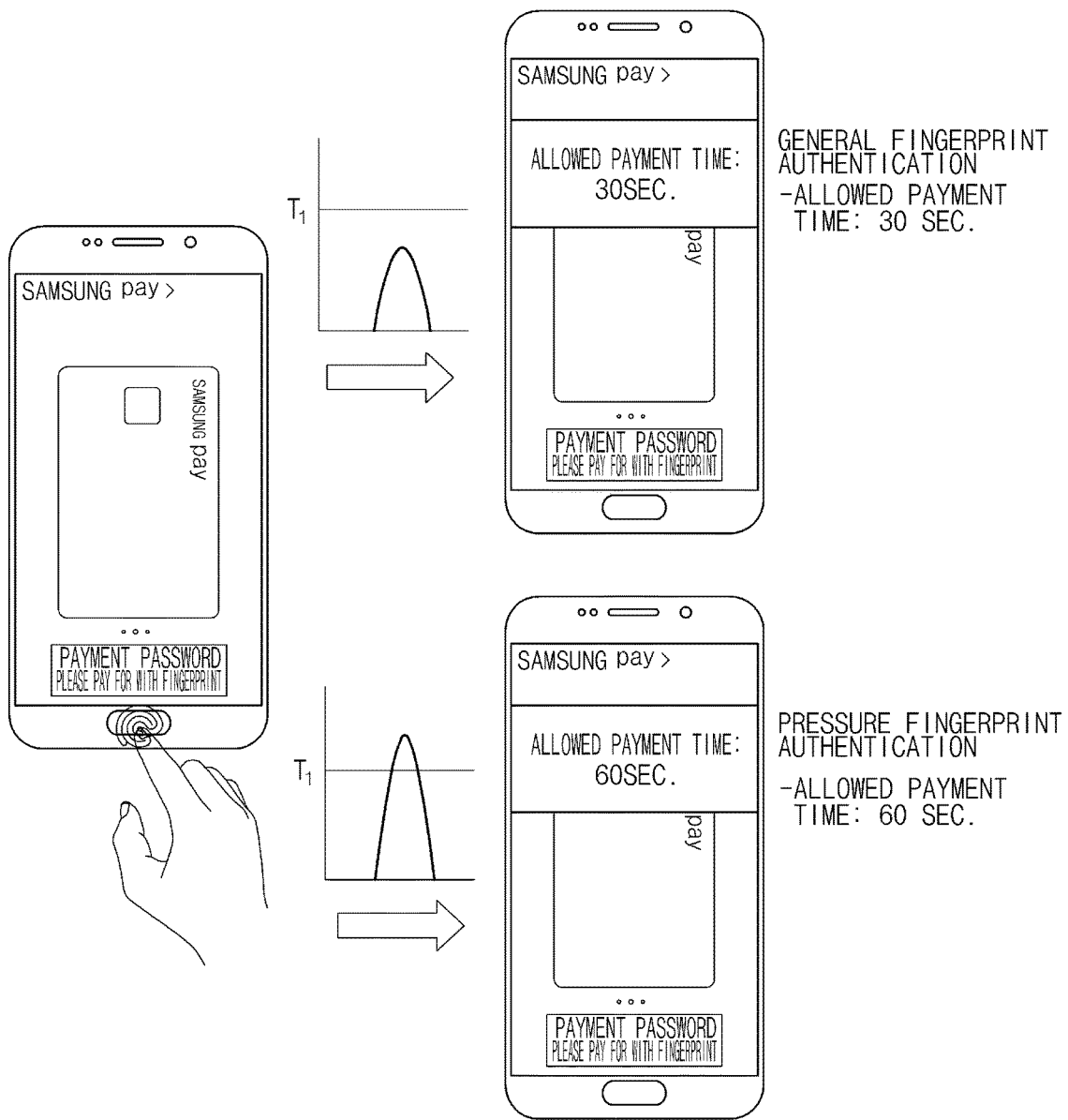
FIG. 7C is a diagram of a fingerprint authentication result screen corresponding to an offline payment application, according to an embodiment.

FIG. 7C is a diagram of a fingerprint authentication result screen corresponding to an offline payment application, according to an embodiment.

As illustrated in FIG. 7C, according to an embodiment, the user may touch a region (e.g., home key region) or an object specified for the execution of credit payment, in the state that the offline payment application is executed. For example, the specified region or the specified object may be a region for obtaining a fingerprint image to be used for fingerprint authentication by the processor 170. When the processor 170 recognizes that the specified region or the specified object is touched, the processor 170 may obtain the fingerprint image from the specified region or the specified object. When the fingerprint authentication is successful, the processor 170 may provide credit payment service by communicating with an external payment terminal through the application executed during a specified time for allowing payment.

According to an embodiment, the processor 170 may perform an operation of specifying the time for allowing payment differently depending on the pressure strength corresponding to the touch to the specified region or the specified object. For example, when the processor 170 senses the pressure having less than the first threshold value and when the general fingerprint authentication is successful, the processor 170 may set the time for allowing the payment to a first time period (e.g., 30 seconds). For another example, when the processor 170 senses the pressure having the first threshold value (or greater than the first threshold value) and the pressure fingerprint is authenticated, the processor 170 may set the time for allowing the payment to a second time period (e.g., 60 seconds).

Figure 7D:
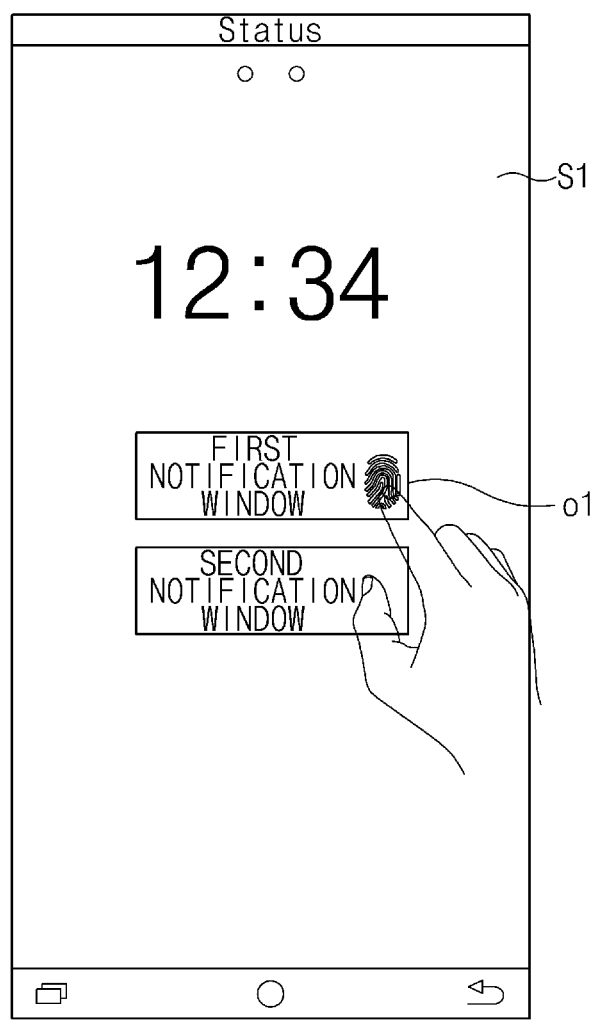
FIG. 7D is a diagram a fingerprint authentication result screen corresponding to a notification window, according to an embodiment.

FIG. 7D is a diagram of the fingerprint authentication result screen corresponding to a notification window, according to an embodiment.

Referring to FIG. 7D, according to an embodiment, the user may touch an object o1 of "first notification window" on a lock screen S1. When it is determined that an object o1 of "first notification window" is touched, the processor 170 may perform the general fingerprint authentication or the pressure fingerprint authentication based on fingerprint data and pressure detected on the object o1 of "first notification window". When the general fingerprint authentication is successful, the processor 170 may release the lock of the electronic device 10 and may output a home screen. According to an embodiment, when the pressure fingerprint authentication is successful, the processor 170 may release the lock of the electronic device 10 and may execute an application requesting for the output of the object o1 of the first notification window. The processor 170 may output the home screen as a background screen when executing the application requesting for the output of the object o1 of the first notification window. According to an embodiment, the processor 170 may execute the application corresponding to the notification window without performing an additional procedure of releasing the locking as the notification window is touched.

Figure 8:
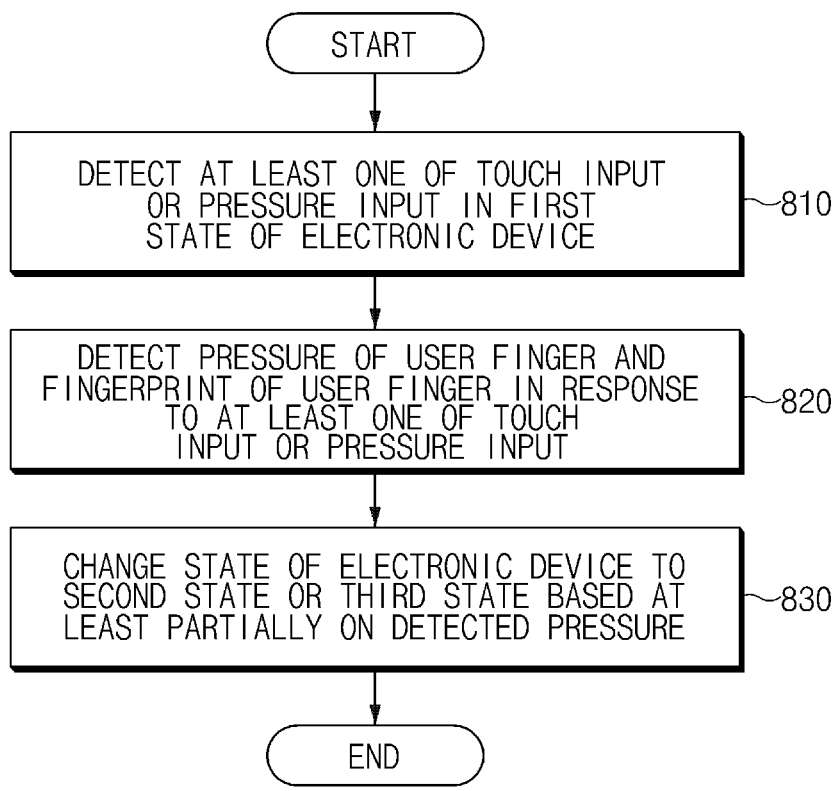
FIG. 8 is a flowchart of a method of an electronic device, according to an embodiment.

FIG. 8 is a flowchart of a method of an electronic device, according to an embodiment.

Referring to FIG. 8, in step 810, the processor 170 may detect a touch input through the touch sensing unit 140 or a pressure input through the pressure sensing unit 160, in a first state (e.g., a lock state) of the electronic device 10.

In step 820, the processor 170 may detect the pressure of a user finger and the fingerprint of the user finger at the position in which the pressure is sensed, in response to at least one of the touch input or the pressure input.

In step 830, the processor 170 may change the state of the electronic device 10 from the first state to a second state or a third state based at least partially on the detected pressure. For example, the second state may include the state of releasing the electronic device from a locked configuration. The second state may be, for example, a state representing a security level lower/less than that of the third state. For example, if the security information (e.g., security folder or security icon) which is open (e.g., display) in the second state is a first number, the security information which is open in the third state is a second number (is greater than the first number). In step 830, the processor 170 may change the state of the electronic device 10 to the second state when the strength of the pressure input is less than the threshold value. When the strength of the pressure input is greater than or equal to the threshold value, the processor 170 may change the state of the electronic device 10 to the third state. The second state may be a state that security information specified for the display 110 is not displayed. The third state may be a state that security information is displayed on the display 110.

Figure 9A:
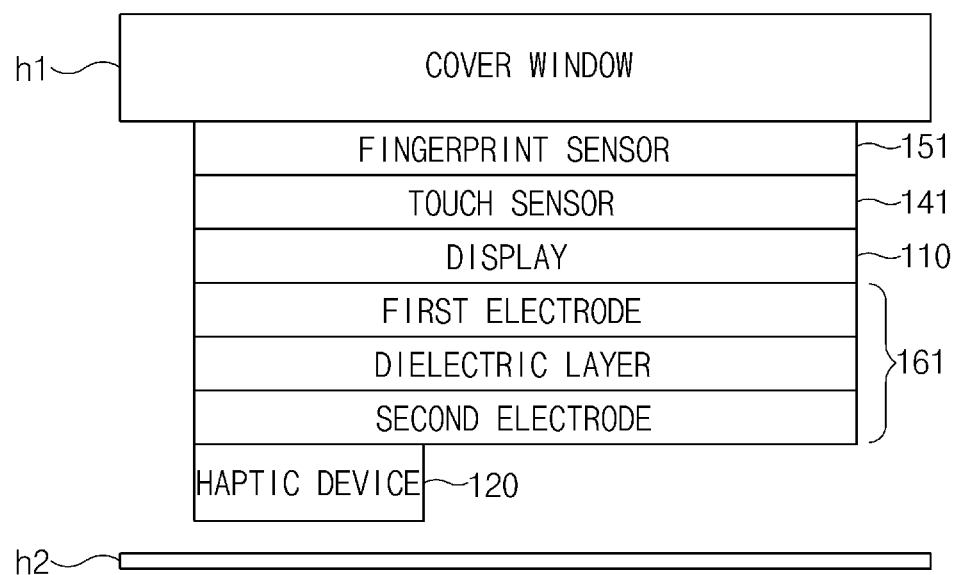
FIGS. 9A and 9B are diagrams of a touch sensor, a pressure sensor, a display, and a fingerprint sensor provided in an electronic device, according to an embodiment.
Figure 9B:
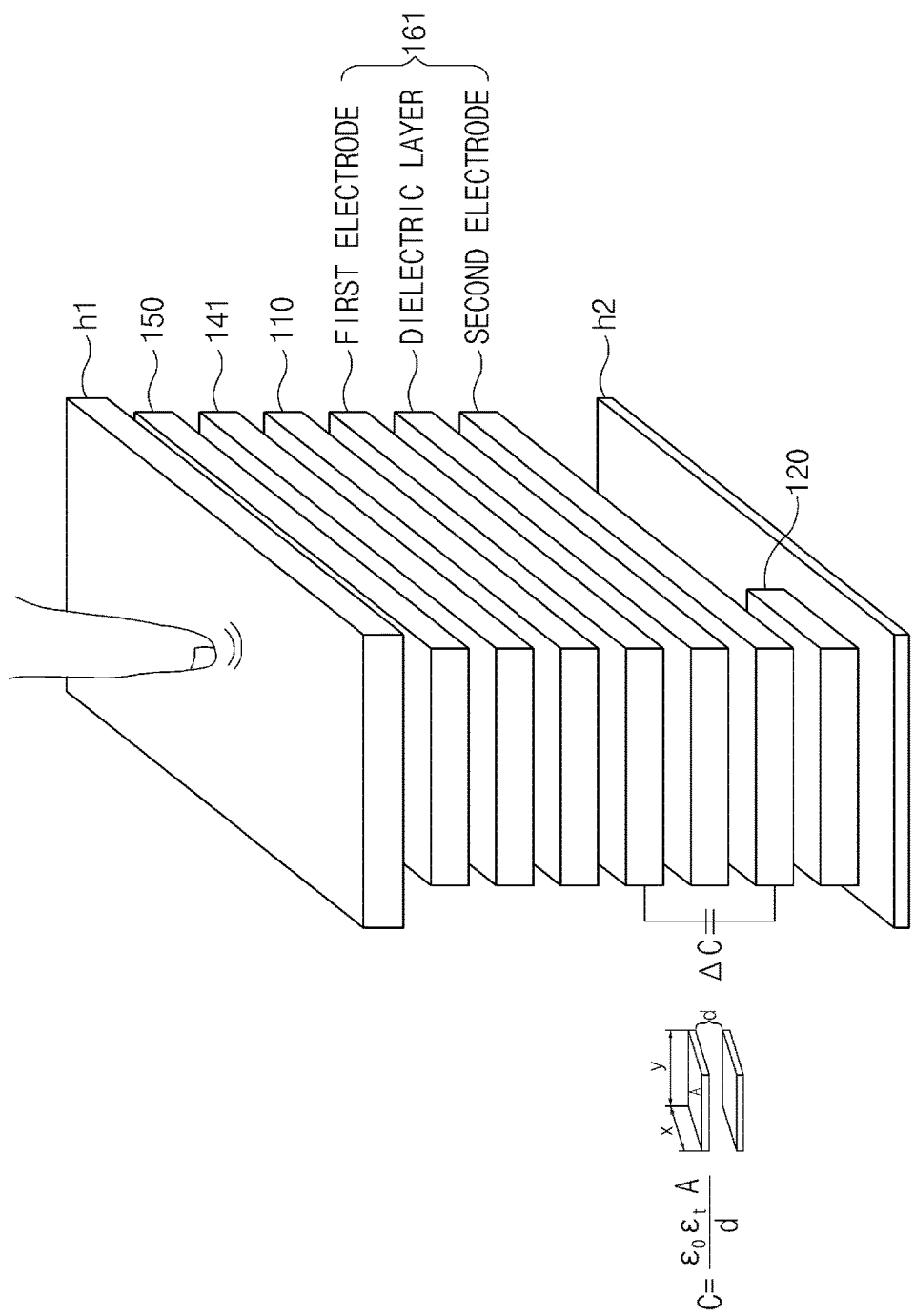

FIGS. 9A and 9B are diagrams of a structure of a touch sensor, a pressure sensor, a display, and a fingerprint sensor included in an electronic device, according to an embodiment.

Referring to FIGS. 9A and 9B, according to an embodiment, the electronic device 10 may include a cover window h1, a touch sensor 141, a fingerprint sensor 151, the display 110, a pressure sensor 161, the haptic device 120, and a rear cover h2. A sensor control integrated circuit (IC) may be interposed between a touch sensing unit 140 including the touch sensor 141, the fingerprint sensor 151, and the pressure sensor 161, and the processor 170 to control the sensing by each sensor. In FIGS. 9A and 9B, the sensor control IC is omitted for the convenience of explanation.

The pressure sensor 161 may include a first electrode, a second electrode, and a dielectric layer interposed between the first and second electrodes. For example, as illustrated in FIG. 9B, the pressure sensor 161 may be disposed under the display 110. The first electrode or the second electrode may be disposed integrally with the display 110 or may be provided on an additional support member (FPCB). Alternatively, the pressure sensor 161 may be interposed between the cover window h1 and the display 110. The first electrode or the second electrode may be disposed integrally with the touch sensor 141 or may be disposed on an additional support member (e.g., polyethylene terephthalate (PET)). Alternatively, the pressure sensor 161 may be disposed at least partially in the display. The first electrode or the second electrode may be interposed between display electrodes.

According to an embodiment, the pressure sensor 161 may sense the pressure by using at least one of the capacitance change, the current change, the resistance change, or the voltage change of the sensing region. FIG. 9A illustrates the pressure sensor 161 implemented in a self-capacitance type or a mutual capacitance type, and the details thereof will be described with reference to FIG. 10A and FIG. 10B. Since the pressure sensing unit 160 is lower than the fingerprint detector 150 and the touch sensing unit 140 in the sensitivity variation depending on position variation, the pressure sensing unit 160 may be disposed under the display 110.

Although FIG. 9A illustrates that the touch sensor is interposed between the cover window h1 and the display 110, the touch sensor 141 may be disposed at least partially disposed inside the display 110 (e.g., may be disposed in at least one electrode layer inside the display). The touch sensor 141 may be implemented in the self-capacitance type or the mutual capacitance type.

The fingerprint sensor 151 may be disposed in at least one of the same layer as that of the display 110, an upper portion of the display 110, and a lower portion of the display 110. For example, when the fingerprint sensor 151 is an ultrasonic sensor or an optical sensor, the fingerprint sensor 151 may be disposed at the lower portion of the display 110. A region of the display 110 for the fingerprint sensor 151 has a hole for transmitting or receiving an ultrasonic wave or light by the fingerprint sensor 151. For another example, the fingerprint sensor 151 may be interposed between pixels of the display 110.

Although FIG. 9A illustrates that one haptic device 120 is disposed under the pressure sensor 161, the haptic device 120 may be variously disposed at various positions. A plurality of haptic devices 120 may be provided. The haptic device 120 may provide various types of vibration feedback to the entire region or a portion of the electronic device 10.

The cover window h1 may include a substantially hard layer, such as glass (including tempered glass or sapphire glass), or a substantially flexible layer such as a polymer (polyimide (PI), polycarbonate (PC), polyethylene terephthalate (PET) or the like).

The display 110 may include an LCD, an LED display, an OLED display, a microelectromechanical systems (MEMS) display, or an electronic paper display. The display 110 may be flexible, transparent, or wearable. The display 110 may include touch circuitry to detect a user's touch input such as a gesture input, a proximity input, or a hovering input or a pressure sensor 161 (or a force sensor), which measures the strength of the pressure by the touch. The touch circuitry or the force sensor may be integrally implemented with the display or may be implemented in the form of one or more sensors provided separately from the display 110. The hologram device may show a stereoscopic image in a space using interference of light. The projector may display an image by projecting light onto a screen. The screen may be, for example, positioned at the inside or the outside of the electronic device 10. The display 110 may include a hologram device or a projector, and a control circuit to control one or more other devices.

The rear cover h2, which serves as the rear surface cover of the electronic device may be provided to protect a plurality of elements of the electronic device 10. At least one printed circuit board (PCB), on which elements of the electronic device 10 including the processor 170 and the memory 130 of the electronic device 10 are mounted, may be interposed between the pressure sensor 161 and the rear cover h2.

Figure 10A:
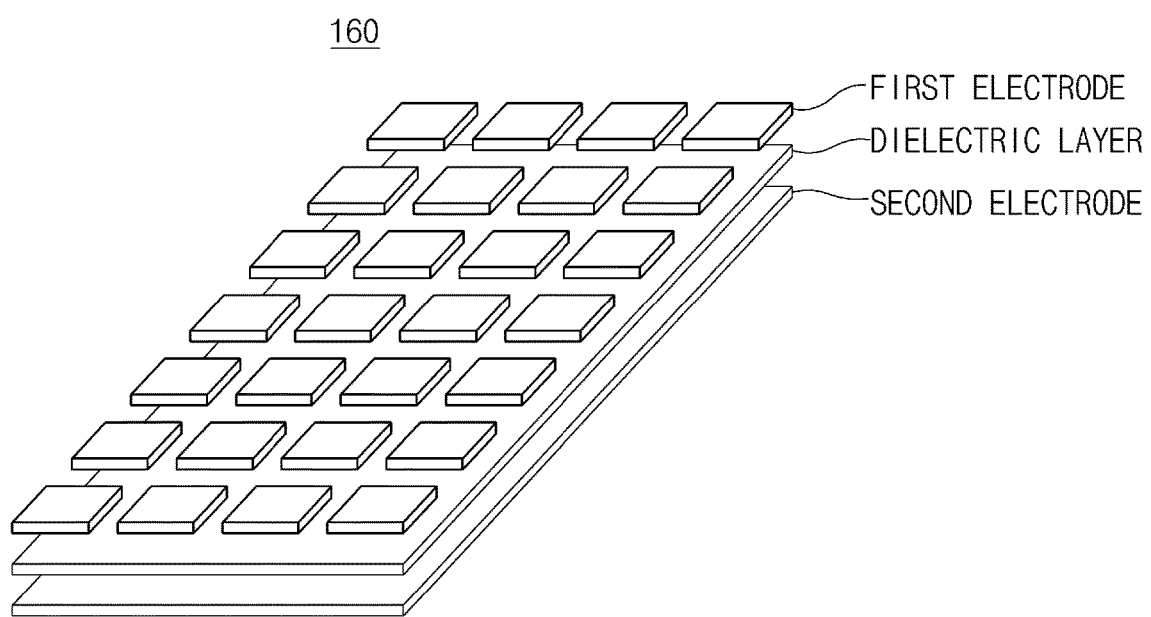
FIG. 10A is a perspective view of a self-capacitance-type pressure sensor, according to an embodiment.

FIG. 10A is a perspective view of a self-capacitance-type pressure sensor, according to an embodiment.

Referring to FIG. 10A, the self-capacitance-type pressure sensor may include a first electrode having one of a plurality of polygonal shapes (or circles), a second electrode formed to accommodate the repeated polygonal shapes of the first electrode, and a dielectric layer, having substantially the same shape as the second electrode, interposed between the first electrode and the second electrode. The pressure sensor 161 may sense pressure based on the capacitance variation between each part of the first electrode and the second electrode. The positions or the shapes of the first electrode and the second electrodes may be changed to each other.

Figure 10B:
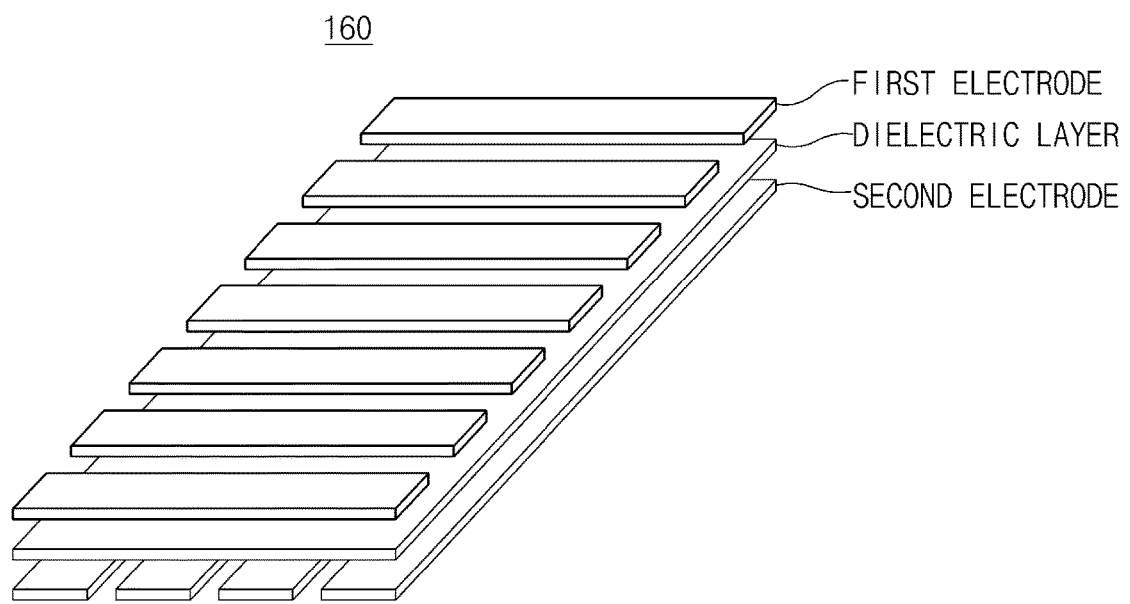
FIG. 10B is a perspective view of a mutual capacitance-type pressure sensor, according to an embodiment.

FIG. 10B is a perspective view illustrating a mutual-capacitance-type pressure sensor.

Referring to FIG. 10B, the mutual-capacitance-type pressure sensor may include a first electrode extending in a first direction, a second electrode extending in a second direction substantially perpendicular to the first direction, and a dielectric layer interposed between the first electrode and the second electrode. The pressure sensor may sense the pressure based on the capacitance variation between the first electrode and the second electrode at a point at which the first electrode crosses the second electrode. The positions or the shapes of the first electrode and the second electrode may be changed to each other.

The first electrode or the second electrode may be opaque or transparent. For example, when the user views the pressure sensor, an object disposed in opposition to the pressure sensor may not be viewed/visible (opaque) or may be viewed (transparent). When the first electrode or the second electrode is opaque, the first electrode or the second electrode may include at least one of copper (Cu), silver (Ag), magnesium (Mg), or titanium (Ti) or the combination of two or more of Cu, Ag, Mg, or Ti. When the first electrode or the second electrode are transparent, the first electrode or the second electrode may include at least one of Indium Tin Oxide (ITO), Indium Zinc Oxide (IZO), a polymer conductor, graphene, or an opaque wire pattern (Ag nanowire, metal mesh, or the like) having a specific line width, or the combination of two or more of ITO, IZO, a polymer conductor, graphene, or the opaque wire pattern.

The dielectric layer may include silicone, air, foam, membrane, optical clean adhesive (OCA), a sponge, a rubber, an ink, or a polymer (e.g., PC, PET, or the like).

Figure 11:
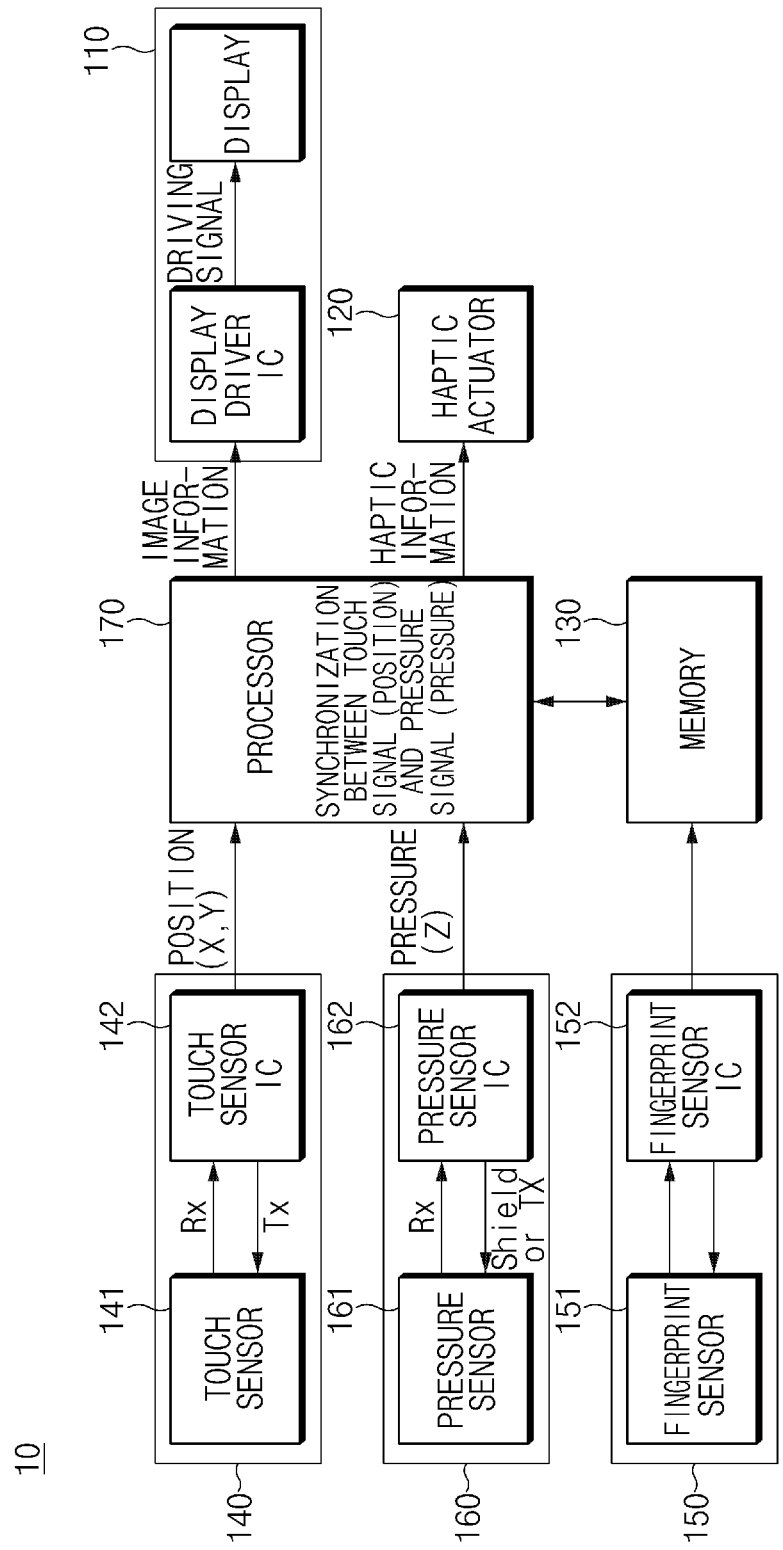
FIG. 11 is a diagram of elements included in the electronic device, according to an embodiment.

FIG. 11 is a diagram of elements included in the electronic device 10, according to an embodiment.

Referring to FIG. 11, the electronic device 10 also includes, in addition to the components already described, a touch sensor IC 142, a fingerprint sensor IC 152, a pressure sensor IC 162, and a display driver IC, or a haptic actuator.

The touch sensor IC 142 may transmit or receive a signal (a transmit signal Tx, a receive signal Rx, a stimulation signal (shield), or the like) together with the touch sensor 141. The touch sensor IC 142 may sense a touch input position of the user, based on the signal transmitted or received together with the touch sensor 141. The touch sensor IC 142 may transmit the sensed touch input position to the processor 170. The touch sensor IC 142 may, for example, transmit or receive a signal together with the touch sensor 141 only in a touchable region defined by the processor 170. In addition, even if the touch sensor IC 142 transmits or receives a signal together with the touch sensor 141 throughout the whole region, the touch sensor IC 142 may transmit the touch input position to the processor 170 when the touch input position is present within the touchable region and may not transmit the touch input position to the processor 170 when the position of the touch input is present out of the touchable region. The touch sensor IC 142 may operate in a normal mode and/or a low power mode. In the low power mode, the touch sensor IC 142 may operate at a lower touch sensing frequency and/or a lower touch scanning period, as compared with those in the normal mode.

The pressure sensor IC 162 may transmit or receive a signal (a transmit signal Tx, a receive signal Rx, a stimulation signal (shield), or the like) together with the pressure sensor 161. The pressure sensor IC 162 may transmit the strength (pressure) of the sensed touch input and/or the time for maintaining the pressure to the processor 170. The processor 170 or the pressure sensor IC 162 may determine the strength (pressure) of the touch input of the user and/or the time for maintaining the pressure based on the signal received from the pressure sensor 161.

The pressure sensor IC 162 may, for example, transmit or receive a signal together with the pressure sensor 161 only in the touchable region defined by the processor 170. In addition, even if the pressure sensor IC 162 transmits or receives a signal together with the pressure sensor 161 throughout the whole region, the pressure sensor IC 162 may transmit the position of a pressure input to the processor 170 when the pressure position is present within a pressurizable region and may not transmit the pressure position to the processor 170 when the position of the pressure input is present out of the pressurizable region. The pressure sensor IC 162 may operate in a normal mode and/or a low power mode. In the low power mode, the pressure sensor IC 162 may operate at a lower pressure sensing frequency and/or a lower pressure scanning period, as compared with those in the normal mode.

The fingerprint sensor IC 152 may transmit or receive a signal (a transmit signal Tx, a receive signal Rx, a fingerprint image signal, or the like) together with the fingerprint sensor 151. The fingerprint sensor IC 152 may transmit a sensed fingerprint image including a valley and a ridge of the sensed fingerprint to the processor 170. The processor 170 or the fingerprint sensor IC 152 may determine the fingerprint image or fingerprint data, which is currently detected, based on a signal received from the fingerprint sensor 151.

The fingerprint sensor IC 152 may transmit or receive a signal together with the fingerprint sensor 151 only in a region for detecting a fingerprint (fingerprint detection region), which is defined by the processor 170. In addition, even if the fingerprint sensor IC 152 transmits or receives a signal together with the fingerprint sensor 151 throughout the whole region, the fingerprint sensor IC 152 may transmit the fingerprint image to the processor 170 when the fingerprint position is present within the fingerprint detection region and may not transmit the fingerprint image to the processor 170 when the position of the fingerprint input is present out of the fingerprint detection region. The fingerprint sensor IC 152 may operate in a normal mode and/or a low power mode. In the low power mode, the fingerprint sensor IC 152 may operate at a lower fingerprint sensing frequency and/or a lower fingerprint scanning period, as compared with those in the normal mode.

The processor 170 may set a region for a user input (touchable region, pressurizable region, or the like) to be recognized by the touch sensor IC 142 and/or the pressure sensor IC 162 and may transmit the region to the touch sensor IC 142 or the pressure sensor IC 162. The position of the user input region may be changed. The processor 170 may transmit the position of the changed user input region to the touch sensor IC 142 and/or the pressure sensor IC 162. The processor 170 may determine image information and the position of the image information to be transmitted to the display driver IC and/or haptic information to be transmitted to the haptic device. For example, the processor 170 may transmit first image information to the display driver IC and transmit first haptic information to the haptic device, when the strength of the received touch input is greater than or equal to the first threshold value. For example, the processor 170 may transmit second image information (e.g., image information obtained by enlarging at least a portion of the first image information) to the display driver IC when the strength of the received touch input is greater than or equal to the second threshold value which is greater than the first threshold value, and may transmit the second haptic information (e.g., haptic information stronger than the first haptic information) to the haptic device. For example, the processor 170 may synchronize a first position and a first size of a touch input received at a first time point with each other, and may synchronize a second position and a second size of a touch input received at a second time point different from the first time point. The processor 170 may transmit the information to each module and may enter an inactive state. The processor 170 may be deactivated in the AOD mode. When the processor 170, which is deactivated in the AOD mode, transmits image information and/or control information to the display driver IC, the touch sensor IC 142, and the pressure sensor IC 162, the processor 170 may be activated to transmit information. After transmitting the information, the processor 170 may be deactivated.

The display driver IC may transmit a driving signal (e.g., a driver driving signal, a gate driving signal, or the like) to the display 110, based on the image information received from the processor 170.

The memory 130 may store instructions or data that, when executed, cause the processor 170 to perform the above operations and may include a volatile memory or a non-volatile memory.

Figure 12:
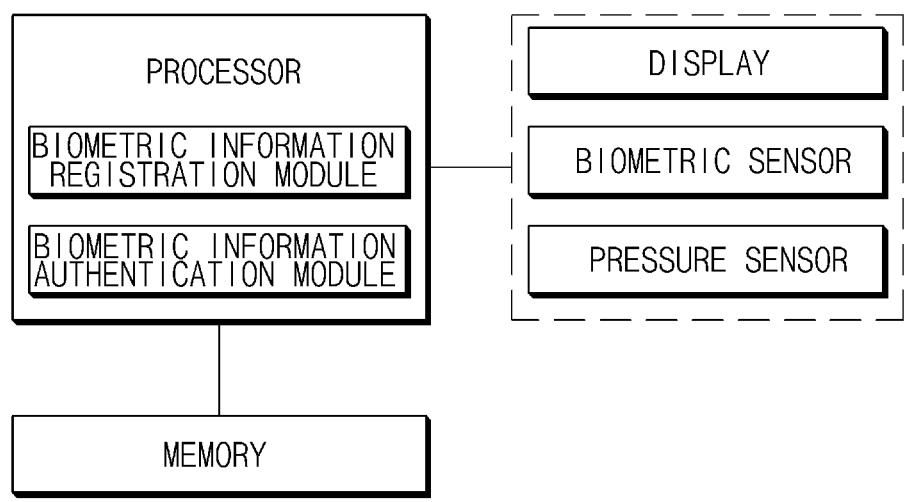
FIG. 12 is a diagram of a processor, a biometric information module, a display, and a sensor (e.g., a biometric sensor, a pressure sensor, or the like) included in the electronic device, according to an embodiment.

FIG. 12 is a diagram of the processor, a biometric information module, a display, and a sensor (e.g., a biometric sensor, a pressure sensor, or the like) included in the electronic device.

The biometric information input through the biometric sensor may be stored in a biometric information registration module included in the processor 170. The biometric information may be changed to other type of information depending on the selection of the user. A biometric information authentication module may call and load the biometric information, which is stored in the biometric information registration module, when that the request for the biometric information authentication of the user is made. When the request for the biometric information authentication is made, the biometric information authentication module compares the stored biometric information with the input biometric information for performing the biometric information authentication.

Figure 13A:
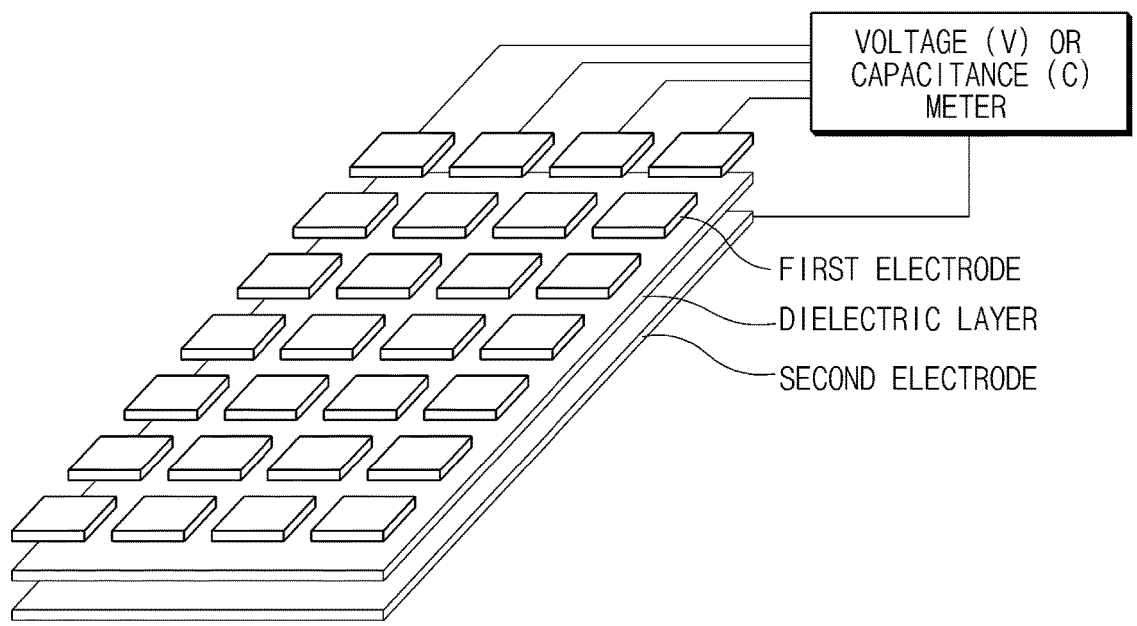
FIG. 13A is a diagram of a capacitive pressure sensor, according to an embodiment.

FIG. 13A is a diagram of a capacitive pressure sensor, which can be used in place of or in combination with the sensor 161, according to an embodiment.

Referring to FIG. 13A, the capacitive pressure sensor including the self-capacitance-type pressure sensor may sense pressure based on that the capacitance formed between two electrodes, and can be varied depending on the pressure by the user. The capacitance may be increased as the distance between the two electrodes is reduced due to the pressure by the user.

Figure 13B:
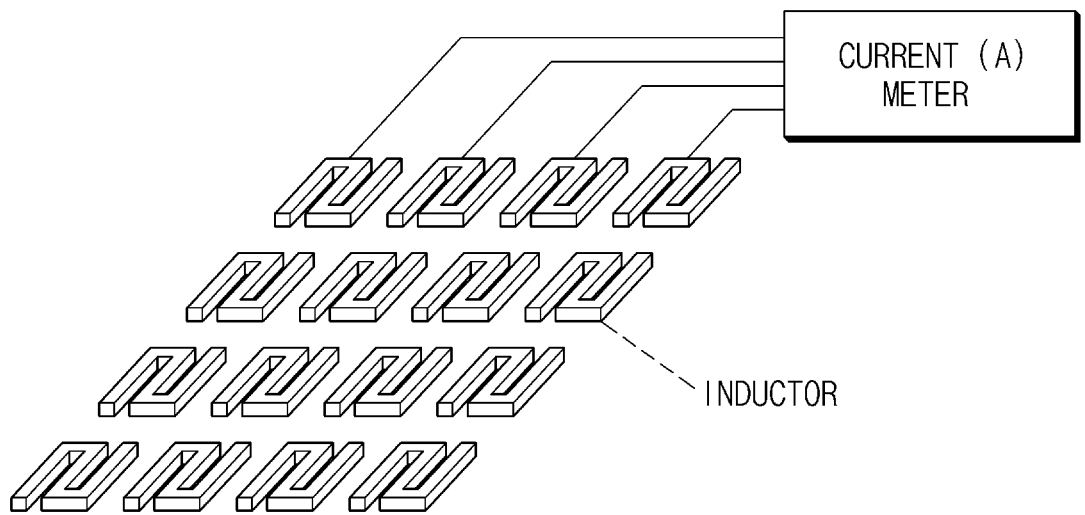
FIG. 13B is a diagram of an inductive pressure sensor, according to an embodiment.

FIG. 13B is a diagram of an inductive pressure sensor, which can be used in place of or in combination with the sensor 161, according to an embodiment.

Referring to FIG. 13B, the inductive pressure sensor may sense pressure based on that current induced to an inductor (e.g., a coil), and can be varied depending on the pressure by the user. The current may be increased as a conductor (e.g., a metal housing, the finger of the user, or the like) approaches the inductor (e.g., a coil), which is disposed inside a housing, by the pressure of the user.

Figure 13C:
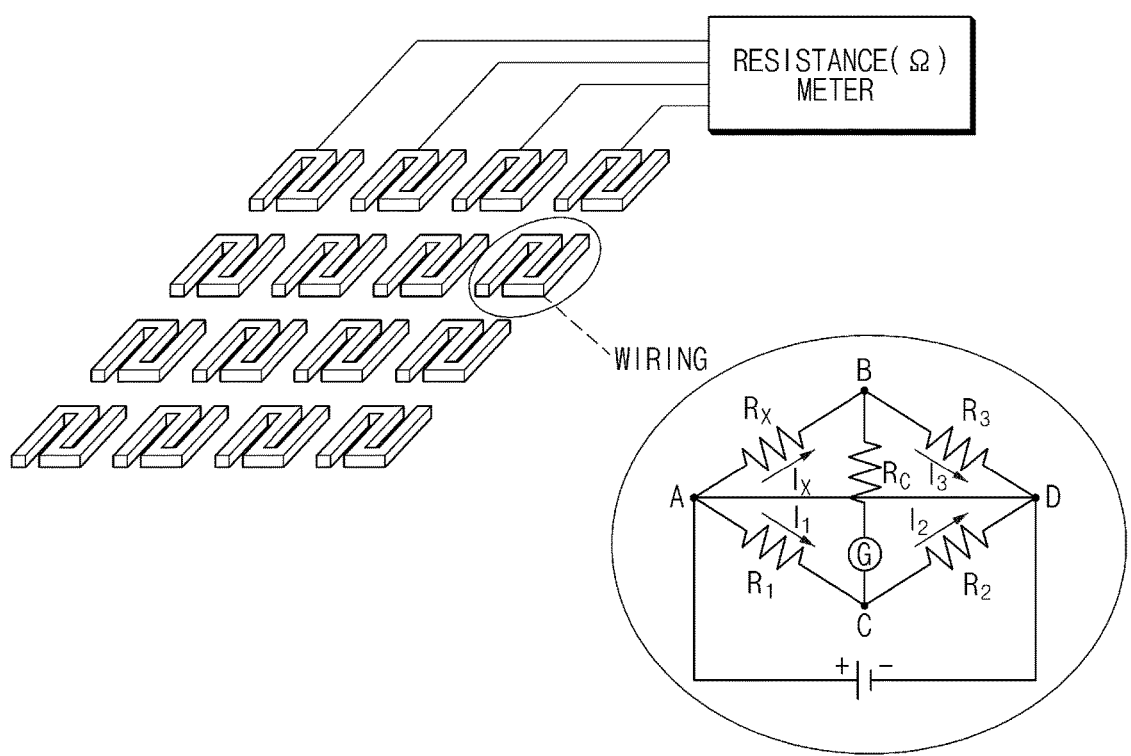
FIG. 13C is a diagram of a strain gauge pressure sensor, according to an embodiment.

FIG. 13C is a diagram of a strain gauge pressure sensor, which can be used in place of or in combination with the sensor 161, according to an embodiment.

Referring to FIG. 13C, the strain gauge pressure sensor may sense the pressure based on that the resistance of a conductor, and can be varied depending on the pressure by the user. The resistance may be increased by reducing the sectional area of the conductor as the length of the conductor is increased due to the pressure by the user. The wiring may be configured in the form of Wheatstone Bridge, as illustrated in the right circuit diagram of FIG. 13C.

Figure 13D:
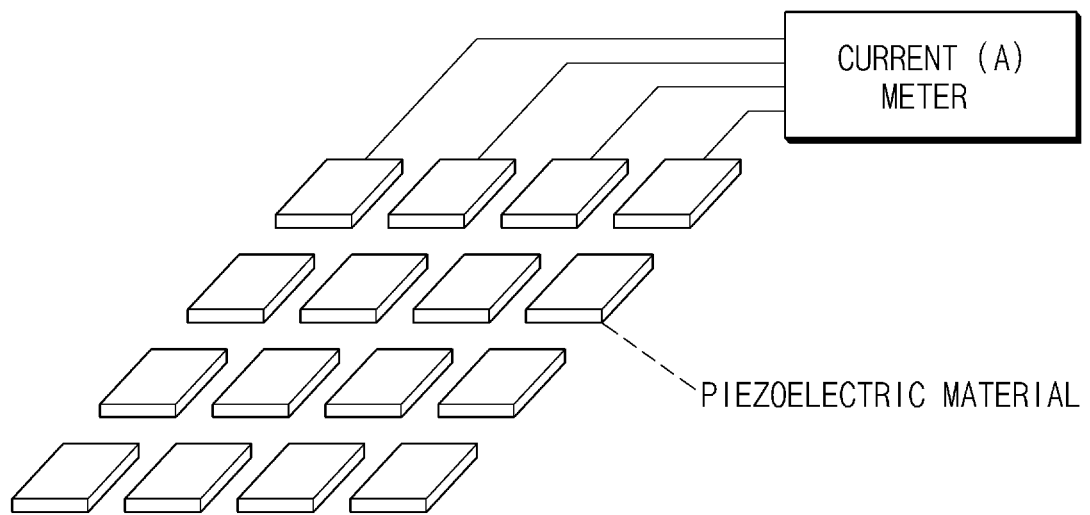
Figure 13E:
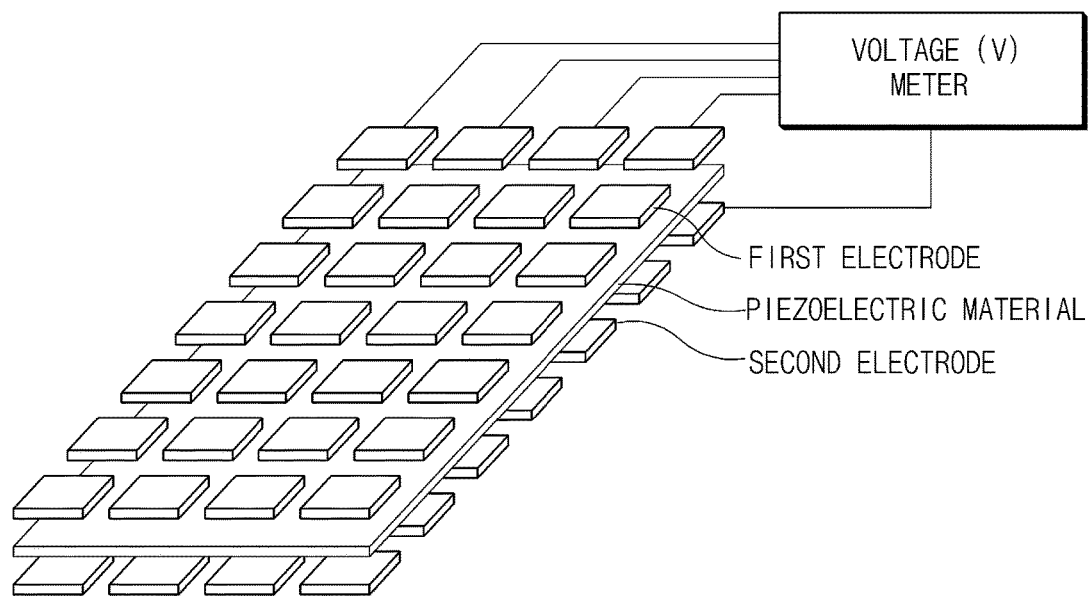

FIGS. 13D and 13E are diagrams of a piezoelectric pressure sensor, which can be used in place of or in combination with the sensor 161, according to various embodiments.

Referring to FIG. 13D, the piezoelectric pressure sensor may sense pressure based on a current difference or a voltage difference caused by a piezoelectric material due to the pressure by the user. The current difference or the voltage difference may be increased as the quantity of current, which is converted by the piezoelectric material, is increased due to the pressure by the user.

According to an embodiment, the electronic device (e.g., electronic device 10 of FIG. 1) includes a housing; a touch screen display (e.g., 110 of FIG. 1) positioned inside the housing; a pressure sensing circuit (e.g., 160 of FIG. 1) configured to detect pressure applied to the touch screen display by external force; a fingerprint sensing circuit (e.g., 150 of FIG. 1) at least partially overlapped with the pressure sensing circuit; a2 wireless communication circuit (e.g., 180 of FIG. 1) a memory (e.g., 130 of FIG. 1); and processor electrically connected with the display, the pressure sensing circuit, the fingerprint sensing circuit, the memory, and the communication circuit and configured to detect a touch input through the touch screen display and a pressure input through the pressure sensing circuit, in a first state of the electronic device, in which the finger print sensing circuit is deactivated; activate the fingerprint sensing circuit in response to one of the touch input and the pressure input; detect a fingerprint of a finger of a user using the fingerprint sensing circuit while detecting pressure of the finger of the user to the touch screen display; and change the electronic device from the first state to a second state or third state based at least partially on the detected pressure.

The first state includes a lock state.

The second state includes a lock release state.

A security level of the second state is less than a security level of the third state.

The processor is further configured to determine whether a strength of the pressure input is greater than or equal to a threshold value; and change the electronic device from the first state to the second state or the third state, based on the determination of the strength of the pressure input.

The processor is further configured to compare the strength of the pressure input with a second threshold value when the strength of the pressure input is greater than or equal to the threshold value; change the electronic device from the first state to the third state when the strength of the pressure input is less than the second threshold value; and change the electronic device from the first state to a fourth state when the strength of the pressure input is greater than or equal to the second threshold value.

The processor is further configured to change the electronic device to the second state in which specified security information is not displayed on the display, when the strength of the pressure input is less than a threshold value; and change the electronic device from the first state to the third state, in which the security information is displayed on the display, when the strength of the pressure input is greater than or equal to the threshold value.

The processor is further configured to when the touch input is used to specify one of objects displayed on the display, change the electronic device from the first state to the second state, in which a first function corresponding to the specified object is performed, when the strength of the pressure input is less than a threshold value; and change the electronic device from the first state to the third state, in which a second function corresponding to the specified object is performed, when the strength of the pressure input is greater than or equal to the threshold value.

When the object provides a plurality of information lists, the first function includes hidden information of the information lists that is not displayed, and the second function includes the hidden information of the information lists that is displayed.

When the object is a web-browser, the first function executes a specified web-page in a logoff state, and the second function executes the specified web-page in a login state.

The memory stores a plurality of reference data for fingerprint authentication, which are registered in a plurality of pressure ranges, and wherein the processor is further configured to identify a strength of the pressure of the finger while detecting the fingerprint of the finger; select a reference data corresponding to the strength among the plurality of the reference data; compare the fingerprint with the selected reference data; and change the electronic device from the first state to the second state or the third state when the fingerprint is matched with the selected reference data.

The pressure sensing circuit is configured to detect a position of the touch input to the display.

The processor is further configured to change the electronic device from the first state to the second state or the third state based on one of a position of the touch input or the pressure input.

The processor is further configured to activate at least a part of the display and at least a partial region of the pressure sensing circuit; and display a specified object on the at least a part of the display, in the first state.

A control method of an electronic device, includes detecting at least one of a touch input and a pressure input in a first state of the electronic device; detecting pressure of a finger of a user and a fingerprint of the finger, in response to at least one of the touch input and the pressure input; and changing a state of the electronic device from the first state to a second state or a third state, based on the detected pressure.

Changing the state of the electronic device includes changing the state of the electronic device from the first state to the second state or the third state, when a specified operation is performed with respect to one of a position of the touch input and the pressure input.

Changing the state of the electronic device includes determining whether a strength of the pressure input is greater than or equal to a threshold value; and changing the state of the electronic device from the first state to the second state or the third state, based on the determination of the strength of the pressure input.

The second state is a state in which security information is not displayed on a display; and wherein the third state is a state in which the security information is displayed on the display.

When the touch input specifies one of objects displayed on the display, the second state is a state that a first function corresponding to the specified object is performed, and the third state is a state that a second function corresponding to the specified object is performed.

The method further includes storing a plurality of reference data for fingerprint authentication, which is registered in a plurality of pressure ranges, wherein changing the state of the electronic device the first state includes: identifying a strength of the pressure of the finger while detecting the fingerprint of the finger; selecting a reference data corresponding to the strength among the plurality of the reference data; comparing the detected fingerprint with the selected reference data; and changing the state of the electronic device from the first state to the second state or the third state when the detected fingerprint is matched with the selected reference data.

Figure 14:
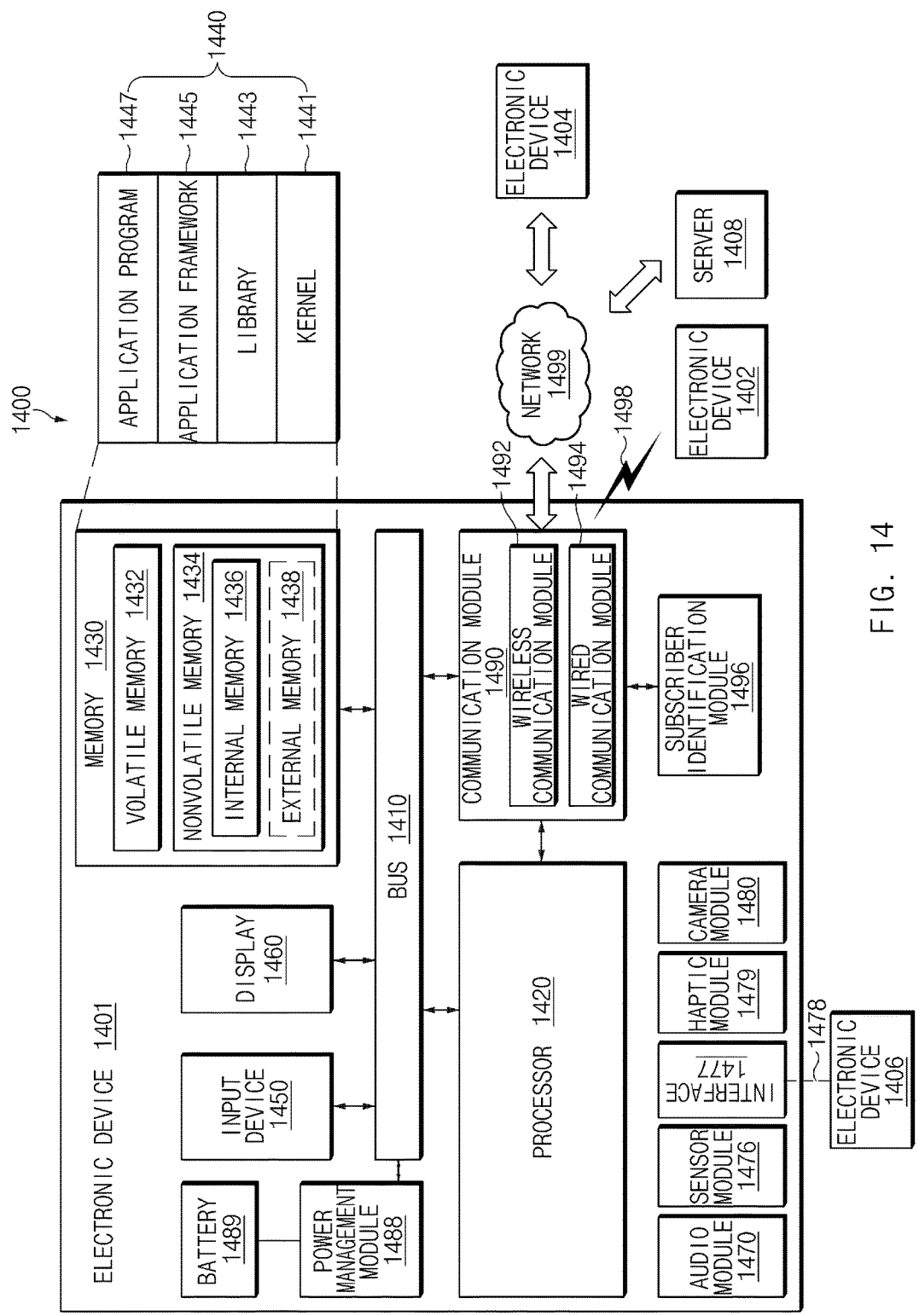
FIG. 14 is a diagram of an electronic device in a network environment, according to an embodiment.

FIG. 14 is a diagram of an electronic device in a network environment, according to an embodiment.

Under the network environment 1400, the electronic device 1401 (e.g., the electronic device 10 of FIG. 1) may communicate with an electronic device 1402 through local wireless communication 1498 or may communication with an electronic device 1404 or a server 1408 through a network 1499. According an embodiment, the electronic device 1401 may communicate with the electronic device 1404 through the server 1408.

According to an embodiment, the electronic device 1401 may include a bus 1410, a processor 1420 (e.g., the processor 170 of FIG. 1) a memory 1430 (e.g., the memory 130 of FIG. 1), an input device 1450 (e.g., a micro-phone or a mouse), a display 1460 (e.g., the display 110 of FIG. 1), an audio module 1470, a sensor module 1476 (e.g., the fingerprint detector 150 and the pressure sensing unit 160 of FIG. 1), an interface 1477, a haptic module 1479 (e.g., the haptic device 120 of FIG. 1), a camera module 1480, a power management module 1488, a battery 1489, a communication module 1490, and a subscriber identification module (SIM) 1496. The electronic device 1401 may not include at least one (of the above-described elements or may further include other element(s).

The bus 1410 may interconnect the above-described elements 1420 to 1490 and may include a circuit for conveying signals (e.g., a control message or data) between the above-described elements. The processor 1420 may include one or more of a central processing unit (CPU), an application processor (AP), a GPU, a camera image signal processor (ISP) of a camera or a communication processor (CP). The processor 1420 may be implemented with a system on chip (SoC) or a system in package (SiP). For example, the processor 1420 may drive an operating system (OS) or an application to control at least one of another element (e.g., hardware or software element) connected to the processor 1420 and may process and compute various data. The processor 1420 may load an instruction or data, which is received from at least one of other elements (e.g., the communication module 1490), into a volatile memory 1432 to process the instruction or data and may store the process result data into a nonvolatile memory 1434.

The memory 1430 may include, for example, the volatile memory 1432 or the nonvolatile memory 1434. The volatile memory 1432 may include, for example, a RAM, a DRAM, a SRAM, or a SDRAM. The nonvolatile memory 1434 may include, for example, one time programmable read-only memory (OTPROM), programmable read-only memory (PROM), an erasable programmable read-only memory (EPROM), an electrically erasable programmable read-only memory (EEPROM), a mask ROM, a flash ROM, a flash memory, a hard drive, or a solid-state drive (SSD). In addition, the nonvolatile memory 1434 may be configured in the form of an internal memory 1436 or the form of an external memory 1438 which is available through connection only if necessary, according to the connection forms of the electronic device 1401. The external memory 1438 may further include a flash drive such as compact flash (CF), secure digital (SD), micro secure digital (micro-SD), mini secure digital (mini-SD), extreme digital (xD), a multimedia card (MMC), or a memory stick. The external memory 1438 may be operatively or physically connected with the electronic device 1401 in a wired manner (e.g., a cable or a universal serial bus (USB)) or a wireless (e.g., BT) manner.

For example, the memory 1430 may store, for example, at least one different software element, such as an instruction or data associated with a program 1440, of the electronic device 1401. The program 1440 may include, for example, a kernel 1441, a library 1443, an application framework 1445 or an application program (application) 1447.

The input device 1450 may include a microphone, a mouse, or a keyboard. According to an embodiment, the keyboard may include a keyboard that is physically connected to the electronic device 1400 or a keyboard virtually displayed through the display 1460.

The display 1460 may include a hologram device or a projector, and a control circuit to control a relevant device. The screen may include an LCD, an LED display, an (OLED display, a plastic POLED), a MEMS display, or an electronic paper display. According to an embodiment, the display 1460 may be flexible, transparent, or wearable. The display may include a touch circuitry, which is able to detect a user's touch input such as a gesture input, a proximity input, or a hovering input or a pressure sensor (a force sensor) which is able to measure the intensity of the pressure by the touch. The touch circuit or the pressure sensor may be implemented integrally with the display or may be implemented with at least one sensor separately from the display. The hologram device may show a stereoscopic image in a space using interference of light. The projector may project light onto a screen to display an image. The screen may be located inside or outside the electronic device 1401.

The audio module 1470 may convert, for example, a sound into an electrical signal or an electrical signal into the sound. According to an embodiment, the audio module 1470 may acquire sound through the input device 1450 (e.g., a microphone) or may output sound through an output device (e.g., a speaker or a receiver) included in the electronic device 1401, the electronic device 1402 (e.g., a wireless speaker or a wireless headphone)) or the electronic device 1406 (e.g., a wired speaker or a wired headphone) connected with the electronic device 1401.

The sensor module 1476 may measure or detect, for example, an internal operating state (e.g., power or temperature) or an external environment state (e.g., an altitude, a humidity, or brightness) of the electronic device 1401 to generate an electrical signal or a data value corresponding to the information of the measured state or the detected state. The sensor module 1476 may include, for example, at least one of a gesture sensor, a gyro sensor, a barometric pressure sensor, a magnetic sensor, an acceleration sensor, a grip sensor, a proximity sensor, a color sensor (e.g., a red, green, blue (RGB) sensor), an infrared sensor, a biometric sensor (e.g., an iris sensor, a fingerprint sensor, a heartbeat rate monitoring (HRM) sensor, an e-nose sensor, an electromyography (EMG) sensor, an electroencephalogram (EEG) sensor, an electrocardiogram (ECG) sensor, a temperature sensor, a humidity sensor, an illuminance sensor or an ultra violet (UV) sensor. The sensor module 1476 may further include a control circuit for controlling at least one or more sensors included therein. According to an embodiment, the sensor module 1476 may be controlled using the processor 1420 or a processor (e.g., a sensor hub) separate from the processor 1420. If the separate processor is used, while the processor 1420 is a sleep state, the separate processor may operate without awakening the processor 1420 to control at least a portion of the operation or the state of the sensor module 1476.

According to an embodiment, the interface 1477 may include a high definition multimedia interface (HDMI), a universal serial bus (USB), an optical interface, a recommended standard 232 (RS-232), a d-subminiature (D-sub), a mobile high-definition link (MHL) interface, a SD card/MMC (multi-media card) interface, or an audio interface. A connector 1478 may physically connect the electronic device 1401 and the electronic device 1406. According to an embodiment, the connector 1478 may include, for example, an USB connector, an SD card/MMC connector, or an audio connector (e.g., a headphone connector).

The haptic module 1479 may convert an electrical signal into mechanical stimulation (e.g., vibration or motion) or into electrical stimulation. For example, the haptic module 1479 may apply tactile or kinesthetic stimulation to a user. The haptic module 1479 may include, for example, a motor, a piezoelectric element, or an electric stimulator.

The camera module 1480 may capture, for example, a still image and a moving picture. According to an embodiment, the camera module 1480 may include at least one lens (e.g., a wide-angle lens and a telephoto lens, or a front lens and a rear lens), an image sensor, an ISP, or a flash (e.g., an LED or a xenon lamp).

The power management module 1488, which is to manage the power of the electronic device 1401, may constitute at least a portion of a power management integrated circuit (PMIC).

The battery 1489 may include a primary cell, a secondary cell, or a fuel cell and may be recharged by an external power source to supply power to at least one element of the electronic device 1401.

The communication module 1490 may establish a communication channel between the electronic device 1401 and the first external electronic device 1402, the second external electronic device 1404, or the server 1408. The communication module 1490 may support wired communication or wireless communication through the established communication channel. According to an embodiment, the communication module 1490 may include a wireless communication module 1492 or a wired communication module 1494. The communication module 1490 may communicate with the first external electronic device 1402, the second external electronic device 1404 or the server 1408 through a first network 1498 (e.g. a wireless local area network (LAN) such as BT or infrared data association (IrDA)) or a second network 1499 (e.g., a wireless wide area network such as a cellular network) through a relevant module among the wireless communication module 1492 or the wired communication module 1494.

The wireless communication module 1492 may support, for example, cellular communication, local wireless communication, global navigation satellite system (GNSS) communication. The cellular communication may include, for example, long-term evolution (LTE), LTE-advance (LTE-A), code division multiple access (CMA), wideband CDMA (WCDMA), universal mobile telecommunications system (UMTS), wireless broadband (WiBro), or global system for mobile communications (GSM). The local wireless communication may include wireless fidelity (Wi-Fi), WiFi Direct, light fidelity, BT, BT low energy (BLE), Zigbee, near field communication (NFC), magnetic secure transmission (MST), radio frequency (RF), or a body area network (BAN). The GNSS may include at least one of a global positioning system (GPS), a global navigation satellite system (Glonass), Beidou Navigation Satellite System (Beidou) or Galileo, the European global satellite-based navigation system, or the like. In the disclosure, "GPS" and "GNSS" may be interchangeably used.

According to an embodiment, when the wireless communication module 1492 supports cellular communication, the wireless communication module 1492 may, for example, identify or authenticate the electronic device 1401 within a communication network using the SIM 1496. According to an embodiment, the wireless communication module 1492 may include the processor 1420 (e.g., an AP and a separate CP. The communication processor may perform at least a portion of functions associated with at least one of elements 1410 to 1496 of the electronic device 1401 in substitute for the processor 1420 when the processor 1420 is in an inactive (sleep) state, and together with the processor 1420 when the processor 1420 is in an active state. According to an embodiment, the wireless communication module 1492 may include a plurality of communication modules, each supporting only a relevant communication scheme among cellular communication, short-range wireless communication, or a GNSS communication scheme.

The wired communication module 1494 may include, for example, a local area network (LAN) service, a power line communication, or a plain old telephone service (POTS).

For example, the first network 1498 may employ WiFi direct or BT for transmitting or receiving instructions or data through wireless direct connection between the electronic device 1401 and the first external electronic device 1402. The second network 1499 may include a telecommunication network (e.g., a computer network such as a LAN or a WAN, the Internet or a telephone network) for transmitting or receiving instructions or data between the electronic device 1401 and the second electronic device 1404.

According to embodiments, the instructions or the data may be transmitted or received between the electronic device 1401 and the second external electronic device 1404 through the server 1408 connected with the second network. Each of the external first and second external electronic devices 1402 and 1404 may be a device of which the type is different from or the same as that of the electronic device 1401. According to various embodiments, all or a part of operations that the electronic device (1401 will perform may be executed by another or a plurality of electronic devices (e.g., the electronic devices 1402 and 1404 or the server 1408. According to an embodiment, in the case that the electronic device 1401 executes any function or service automatically or in response to a request, the electronic device 1401 may not perform the function or the service internally, but may alternatively or additionally transmit requests for at least a part of a function associated with the electronic device 1401 to another device (e.g., the electronic device 1402 or 1404 or the server 1408). The another electronic device (e.g., the electronic device 1402 or 1404 or the server 1408) may execute the requested function or additional function and may transmit the execution result to the electronic device 1401. The electronic device 1401 may provide the requested function or service using the received result or may additionally process the received result to provide the requested function or service. To this end, for example, cloud computing, distributed computing, or client-server computing may be used.

At least a part of an apparatus (e.g., modules or functions thereof) or a method (e.g., operations) may be, for example, implemented by instructions stored in a non-transitory computer-readable storage medium in the form of a program module. The instructions, when executed by the processor 1420, may cause one or more processors to perform a function corresponding to the instruction. The non-transitory computer-readable storage medium may be the memory 1430.

A non-transitory computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., ROM, RAM, or a flash memory). Also, a program instruction may include not only a mechanical code such as generated by a compiler but also a high-level language code executable on a computer using an interpreter. The above hardware unit may be configured to operate via one or more software modules for performing an operation according to an embodiment of the present disclosure, and vice versa.

A module or a program module may include at least one of the above elements, or a part of the above elements may be omitted, or additional other elements may be further included. Operations performed by a module, a program module, or other elements may be executed sequentially, in parallel, repeatedly, or in a heuristic method. In addition, some operations may be executed in different sequences or may be omitted. Alternatively, other operations may be added.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. An electronic device comprising:
   a housing;
   a touch screen display positioned inside the housing;
   a pressure sensing circuit configured to detect pressure applied to the touch screen display by external force;
   a fingerprint sensing circuit at least partially overlapped with the pressure sensing circuit;
   a wireless communication circuit;
   a memory; and
   a processor electrically connected with the display, the pressure sensing circuit, the fingerprint sensing circuit, the memory, and the communication circuit and configured to:
   detect a touch input through the touch screen display and a pressure input through the pressure sensing circuit, in a first state of the electronic device, in which the fingerprint sensing circuit is deactivated;
   activate the fingerprint sensing circuit in response to one of the touch input and the pressure input;
   detect a fingerprint of a finger of a user using the fingerprint sensing circuit while detecting pressure of the finger of the user to the touch screen display; and
   change the electronic device from the first state to a second state or third state based on the detected pressure, wherein the processor is further configured to:
   change the electronic device from the first state to the second state, in which specified security information is not displayed on the display, when the strength of the pressure input is less than a threshold value; and
   change the electronic device from the first state to the third state, in which the security information is displayed on the display, when the strength of the pressure input is greater than or equal to the threshold value.

2. The electronic device of claim 1, wherein the first state includes a lock state.

3. The electronic device of claim 1, wherein the second state includes a lock release state.

4. The electronic device of claim 1, wherein a security level of the second state is less than a security level of the third state.

5. The electronic device of claim 1, wherein the processor is further configured to:
   determine whether a strength of the pressure input is greater than or equal to a threshold value; and
   change the electronic device from the first state to the second state or the third state based on the determination of the strength of the pressure input.

6. The electronic device of claim 5, wherein the processor is further configured to:
   compare the strength of the pressure input with a second threshold value when the strength of the pressure input is greater than or equal to the threshold value;
   change the electronic device from the first state to the third state when the strength of the pressure input is less than the second threshold value; and
   change the electronic device from the first state to a fourth state when the strength of the pressure input is greater than or equal to the second threshold value.

7. The electronic device of claim 1, wherein the processor is further configured to:
   when the touch input is used to specify one of objects displayed on the display,
   change the electronic device from the first state to the second state, in which a first function corresponding to the specified object is performed, when the strength of the pressure input is less than a threshold value; and
   change the electronic device from the first state to the third state, in which a second function corresponding to the specified object is performed, when the strength of the pressure input is greater than or equal to the threshold value.

8. The electronic device of claim 7, wherein, when the object provides a plurality of information lists,
   the first function includes hidden information of the information lists that is not displayed, and
   the second function includes t the hidden information of the information lists that is displayed.

9. The electronic device of claim 7, wherein, when the object is a web-browser,
   the first function executes a specified web-page in a logoff state, and
   the second function executes the specified web-page in a login state.

10. The electronic device of claim 1, wherein the memory stores reference data for fingerprint authentication, which are registered in a plurality of pressure ranges, and
    wherein the processor is further configured to:
    identify a strength of the pressure of the finger while detecting the fingerprint of the finger;
    select a reference data corresponding to the strength among the plurality of the reference data;
    compare the fingerprint with the selected reference data; and
    change the electronic device from the first state to the second state or the third state when the fingerprint matches the selected reference data.

11. The electronic device of claim 1, wherein the pressure sensing circuit is configured to detect a position of the touch input to the display.

12. The electronic device of claim 1, wherein the processor is further configured to:
    change the electronic device from the first state to the second state or the third state based on one of a position of the touch input or the pressure input.

13. The electronic device of claim 1, wherein the processor is further configured to:
    activate at least a part of the display and at least a partial region of the pressure sensing circuit; and
    display a specified object on the at least a part of the display in the first state.

14. A method of an electronic device comprising:
    detecting at least one of a touch input and a pressure input in a first state of the electronic device;
    detecting pressure of a finger of a user and a fingerprint of the finger in response to at least one of the touch input and the pressure input; and
    changing a state of the electronic device from the first state to a second state or a third state based on the detected pressure, wherein the electronic device is changed from the first state to the second state, in which specified security information is not displayed on a display, when the strength of the pressure input is less than a threshold value and the electronic device is changed from the first state to the third state, in which the security information is displayed on the display, when the strength of the pressure input is greater than or equal to the threshold value.

15. The method of claim 14, wherein changing the state of the electronic device includes:
changing the state of the electronic device from the first state to the second state or the third state when a specified operation is performed with respect to one of a position of the touch input and the pressure input.

16. The method of claim 14, wherein changing the state of the electronic device includes:
determining whether a strength of the pressure input is greater than or equal to a threshold value; and
changing the state of the electronic device from the first state to the second state or the third state based on the determination of the strength of the pressure input.

17. The method of claim 16, wherein the second state is a state in which security information is not displayed on a display; and
wherein the third state is a state in which the security information is displayed on the display.

18. The method of claim 16, wherein, when the touch input specifies one of objects displayed on the display,
the second state is a state that a first function corresponding to the specified object is performed, and
the third state is a state that a second function corresponding to the specified object is performed.

19. The method of claim 14, further comprising:
storing reference data for fingerprint authentication, which is registered in a plurality of pressure ranges,
wherein changing the state of the electronic device from the first state includes:
identifying a strength of the pressure of the finger while detecting the fingerprint of the finger;
selecting a reference data corresponding to the strength among the plurality of the reference data;
comparing the detected fingerprint with the selected reference data; and changing the state of the electronic device from the first state to the second state or the third state when the detected the fingerprint matches the selected reference data.

* * * * *